United States Patent
Balasubramanian et al.

(10) Patent No.: US 11,540,089 B1
(45) Date of Patent: Dec. 27, 2022

(54) RECONFIGURABLE INTELLIGENT SURFACE ENABLED SIDELINK POSITIONING

(71) Applicant: QUALCOMM Incorporated, San Diego, CA (US)

(72) Inventors: Anantharaman Balasubramanian, San Diego, CA (US); Kapil Gulati, Belle Mead, NJ (US); Dan Vassilovski, Del Mar, CA (US); Shuanshuan Wu, San Diego, CA (US); Junyi Li, Fairless Hills, PA (US); Sourjya Dutta, San Diego, CA (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/483,449

(22) Filed: Sep. 23, 2021

(51) Int. Cl.
*H04W 4/029* (2018.01)
*G01S 5/10* (2006.01)
*H04L 5/00* (2006.01)
*H04W 24/10* (2009.01)

(52) U.S. Cl.
CPC .............. *H04W 4/029* (2018.02); *G01S 5/10* (2013.01); *H04L 5/0048* (2013.01); *H04W 24/10* (2013.01)

(58) Field of Classification Search
CPC ......... H04W 4/029; H04W 24/10; G01S 5/10; H04L 5/0048
See application file for complete search history.

(56) References Cited

U.S. PATENT DOCUMENTS

| 8,982,788 B2 * | 3/2015 | Han | H04L 5/0053 |
| | | | 455/524 |
| 9,344,248 B2 * | 5/2016 | Krishnamurthy | H04L 5/0053 |

* cited by examiner

*Primary Examiner* — Kabir A Timory
(74) *Attorney, Agent, or Firm* — Thien T. Nguyen

(57) ABSTRACT

In an aspect, a user equipment (UE) may control one or more reconfigurable intelligent surfaces (RIS) in accordance with one or more RIS schedules that indicate times when the one or more RIS are in an enabled state and times when the one or more RIS are in a disabled state. The UE may request at least one participating UE of one or more participating UEs to transmit at least one positioning reference signal (PRS) in a PRS resource. The UE may measure the at least one PRS from the at least one participating UE in accordance with the RIS schedule to make one or more measurements of the at least one PRS when the one or more RIS are in the disabled state and to make one or more measurements of the at least one PRS when the one or more RIS are in the enabled state.

40 Claims, 25 Drawing Sheets

RIS1 = OFF
RIS2 = ON

UE2 – Transmit *PRS*
UE1 – Measure *PRS*

RIS1 = OFF
RIS2 = ON

UE1 – Transmit *PRS*
UE2 – Measure *PRS*

ToA at UE2 of PRS
resource transmitted
by UE1

*ToA_d9*   *ToA_ris2(3)*   time

US 11,540,089 B1

RECONFIGURABLE INTELLIGENT SURFACE ENABLED SIDELINK POSITIONING

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high-speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth-generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes controlling one or more reconfigurable intelligent surfaces (RIS) in accordance with one or more RIS schedules, wherein the one or more RIS schedules indicate times when the one or more RIS are in an enabled state and times when the one or more RIS are in a disabled state; requesting at least one participating UE of one or more participating UEs to transmit at least one positioning reference signal (PRS); performing a first set of one or more measurements of the at least one PRS transmitted from the at least one participating UE, wherein the at least one PRS is measured while performing the first set of one or more measurements in accordance with the RIS schedule to obtain one or more measurements of the at least one PRS when the one or more RIS are in the disabled state; and performing a second set of one or more measurements of the at least one PRS transmitted from the at least one participating UE, wherein the at least one PRS is measured while performing the second set of one or more measurements in accordance with the RIS schedule to obtain one or more measurements of the at least one PRS when the one or more RIS are in the enabled state.

In an aspect, a method of wireless communication performed by a first user equipment (UE) includes receiving a report request from a second UE to measure at least one positioning reference signal (PRS) transmitted from the second UE during a first time interval and a second time interval; and sending a report to the second UE in response to the report request, the report including a time-of-arrival associated with a direct path measurement of the at least one PRS obtained during the first time interval, the report further including both a time-of-arrival associated with a direct path measurement and a time-of-arrival associated with a reflective path measurement of the at least one PRS obtained during the second time interval.

In an aspect, a method of wireless communication performed by a first user equipment (UE) includes receiving, from a second UE, a reconfigurable intelligent surface (RIS) schedule, wherein the RIS schedule indicates times when at least one RIS of one or more RIS resources is in an enabled state and times when the at least one RIS of the one or more RIS is in a disabled state; receiving, from the second UE, a positioning reference signal (PRS) measurement schedule, wherein the PRS measurement schedule indicates times when at least one PRS from the second UE may be measured by the first UE; performing a first set of one or more measurements of the at least one PRS transmitted from the second UE in accordance with the PRS measurement schedule and the RIS schedule to obtain one or more measurements of the at least one PRS when the at least one RIS is in the disabled state; and performing a second set of one or more measurements of the at least one PRS transmitted from the second UE in accordance with the PRS measurement schedule and the RIS schedule to obtain one or more measurements of the at least one PRS when the at least one RIS is in the enabled state.

In an aspect, a method of wireless communication performed by a first user equipment (UE) includes receiving, from a second UE, an RIS schedule, wherein the RIS schedule indicates times when at least one RIS is in an enabled state and times when the at least one RIS is in a disabled state; sending a request to a third UE to transmit at least one positioning reference signal (PRS), wherein the request indicates times when the at least one PRS is expected to be transmitted by the third UE; and performing a first set of one or more measurements of the at least one PRS transmitted from the third UE in accordance with the RIS schedule to make one or more measurements of the at least one PRS when the at least one RIS is in the disabled state; and performing a second set of one or more measurements of the at least one PRS from the third UE in accordance with the RIS schedule to make one or more measurements of the at least one PRS when the at least one RIS is in the enabled state.

In an aspect, a user equipment (UE) includes a memory; at least one transceiver; and at least one processor communicatively coupled to the memory and the at least one transceiver, the at least one processor configured to: control one or more reconfigurable intelligent surfaces (RIS) in accordance with one or more RIS schedules, wherein the one or more RIS schedules indicate times when the one or more RIS are in an enabled state and times when the one or more MS are in a disabled state; request at least one participating UE of one or more participating UEs to transmit at least one positioning reference signal (PRS); perform a first set of one or more measurements of the at least one PRS transmitted from the at least one participating UE, wherein the at least one PRS is measured while performing the first set of one or more measurements in accordance with the RIS schedule to obtain one or more measurements of the at least one PRS when the one or more RIS are in the disabled state; and perform a second set of one or more measurements of the at least one PRS transmitted from the at least one participating UE, wherein the at least one PRS is measured while performing the second set of one or more measurements in accordance with the RIS schedule to obtain one or more measurements of the at least one PRS when the one or more RIS are in the enabled state.

In an aspect, a first user equipment (UE) includes a memory; at least one transceiver; and at least one processor communicatively coupled to the memory and the at least one transceiver, the at least one processor configured to: receive, via the at least one transceiver, a report request from a second UE to measure at least one positioning reference signal (PRS) transmitted from the second UE during a first time interval and a second time interval; and send, via the at least one transceiver, a report to the second UE in response to the report request, the report including a time-of-arrival associated with a direct path measurement of the at least one PRS obtained during the first time interval, the report further including both a time-of-arrival associated with a direct path measurement and a time-of-arrival associated with a reflective path measurement of the at least one PRS obtained during the second time interval.

In an aspect, a first user equipment (UE) includes a memory; at least one transceiver; and at least one processor communicatively coupled to the memory and the at least one transceiver, the at least one processor configured to: receive, via the at least one transceiver, from a second UE, a reconfigurable intelligent surface (RIS) schedule, wherein the RIS schedule indicates times when at least one RIS of one or more RIS resources is in an enabled state and times when the at least one RIS of the one or more RIS is in a disabled state; receive, via the at least one transceiver, from the second UE, a positioning reference signal (PRS) measurement schedule, wherein the PRS measurement schedule indicates times when at least one PRS from the second UE may be measured by the first UE; perform a first set of one or more measurements of the at least one PRS transmitted from the second UE in accordance with the PRS measurement schedule and the RIS schedule to obtain one or more measurements of the at least one PRS when the at least one RIS is in the disabled state; and perform a second set of one or more measurements of the at least one PRS transmitted from the second UE in accordance with the PRS measurement schedule and the RIS schedule to obtain one or more measurements of the at least one PRS when the at least one RIS is in the enabled state.

In an aspect, a first user equipment (UE) includes a memory; at least one transceiver; and at least one processor communicatively coupled to the memory and the at least one transceiver, the at least one processor configured to: receive, via the at least one transceiver, from a second UE, an RIS schedule, wherein the RIS schedule indicates times when at least one RIS is in an enabled state and times when the at least one RIS is in a disabled state; send, via the at least one transceiver, a request to a third UE to transmit at least one positioning reference signal (PRS), wherein the request indicates times when the at least one PRS is expected to be transmitted by the third UE; and perform a first set of one or more measurements of the at least one PRS transmitted from the third UE in accordance with the RIS schedule to make one or more measurements of the at least one PRS when the at least one RIS is in the disabled state; and perform a second set of one or more measurements of the at least one PRS from the third UE in accordance with the RIS schedule to make one or more measurements of the at least one PRS when the at least one RIS is in the enabled state.

In an aspect, a user equipment (UE) includes means for controlling one or more reconfigurable intelligent surfaces (RIS) in accordance with one or more RIS schedules, wherein the one or more RIS schedules indicate times when the one or more RIS are in an enabled state and times when the one or more RIS are in a disabled state; means for requesting at least one participating UE of one or more participating UEs to transmit at least one positioning reference signal (PRS); means for performing a first set of one or more measurements of the at least one PRS transmitted from the at least one participating UE, wherein the at least one PRS is measured while performing the first set of one or more measurements in accordance with the RIS schedule to obtain one or more measurements of the at least one PRS when the one or more RIS are in the disabled state; and means for performing a second set of one or more measurements of the at least one PRS transmitted from the at least one participating UE, wherein the at least one PRS is measured while performing the second set of one or more measurements in accordance with the RIS schedule to obtain one or more measurements of the at least one PRS when the one or more RIS are in the enabled state.

In an aspect, a first user equipment (UE) includes means for receiving a report request from a second UE to measure at least one positioning reference signal (PRS) transmitted from the second UE during a first time interval and a second time interval; and means for sending a report to the second UE in response to the report request, the report including a time-of-arrival associated with a direct path measurement of the at least one PRS obtained during the first time interval, the report further including both a time-of-arrival associated with a direct path measurement and a time-of-arrival associated with a reflective path measurement of the at least one PRS obtained during the second time interval.

In an aspect, a first user equipment (UE) includes means for receiving, from a second UE, a reconfigurable intelligent surface (RIS) schedule, wherein the RIS schedule indicates times when at least one RIS of one or more RIS resources is in an enabled state and times when the at least one RIS of the one or more RIS is in a disabled state; means for receiving, from the second UE, a positioning reference signal (PRS) measurement schedule, wherein the PRS measurement schedule indicates times when at least one PRS from the second UE may be measured by the first UE; means for performing a first set of one or more measurements of the at least one PRS transmitted from the second UE in accordance with the PRS measurement schedule and the RIS schedule to obtain one or more measurements of the at least one PRS when the at least one RIS is in the disabled state; and means for performing a second set of one or more measurements of the at least one PRS transmitted from the second UE in accordance with the PRS measurement schedule and the RIS schedule to obtain one or more measurements of the at least one PRS when the at least one RIS is in the enabled state.

In an aspect, a first user equipment (UE) includes means for receiving, from a second UE, an RIS schedule, wherein the RIS schedule indicates times when at least one RIS is in an enabled state and times when the at least one RIS is in a disabled state; means for sending a request to a third UE to transmit at least one positioning reference signal (PRS), wherein the request indicates times when the at least one PRS is expected to be transmitted by the third UE; and means for performing a first set of one or more measurements of the at least one PRS transmitted from the third UE in accordance with the MS schedule to make one or more measurements of the at least one PRS when the at least one MS is in the disabled state; and means for performing a second set of one or more measurements of the at least one PRS from the third UE in accordance with the MS schedule to make one or more measurements of the at least one PRS when the at least one MS is in the enabled state.

In an aspect, a non-transitory computer-readable medium storing computer-executable instructions that, when executed by a user equipment (UE), cause the UE to: control one or more reconfigurable intelligent surfaces (RIS) in accordance with one or more RIS schedules, wherein the one or more RIS schedules indicate times when the one or more RIS are in an enabled state and times when the one or more RIS are in a disabled state; request at least one participating UE of one or more participating UEs to transmit at least one positioning reference signal (PRS); perform a first set of one or more measurements of the at least one PRS transmitted from the at least one participating UE, wherein the at least one PRS is measured while performing the first set of one or more measurements in accordance with the RIS schedule to obtain one or more measurements of the at least one PRS when the one or more RIS are in the disabled state; and perform a second set of one or more measurements of the at least one PRS transmitted from the at least one participating UE, wherein the at least one PRS is measured while performing the second set of one or more measurements in accordance with the RIS schedule to obtain one or more measurements of the at least one PRS when the one or more RIS are in the enabled state.

In an aspect, a non-transitory computer-readable medium storing computer-executable instructions that, when executed by a first user equipment (UE), cause the first UE to: receive a report request from a second UE to measure at least one positioning reference signal (PRS) transmitted from the second UE during a first time interval and a second time interval; and send a report to the second UE in response to the report request, the report including a time-of-arrival associated with a direct path measurement of the at least one PRS obtained during the first time interval, the report further including both a time-of-arrival associated with a direct path measurement and a time-of-arrival associated with a reflective path measurement of the at least one PRS obtained during the second time interval.

In an aspect, a non-transitory computer-readable medium storing computer-executable instructions that, when executed by a first user equipment (UE), cause the first UE to: receive, from a second UE, a reconfigurable intelligent surface (RIS) schedule, wherein the RIS schedule indicates times when at least one RIS of one or more MS resources is in an enabled state and times when the at least one MS of the one or more MS is in a disabled state; receive, from the second UE, a positioning reference signal (PRS) measurement schedule, wherein the PRS measurement schedule indicates times when at least one PRS from the second UE may be measured by the first UE; perform a first set of one or more measurements of the at least one PRS transmitted from the second UE in accordance with the PRS measurement schedule and the RIS schedule to obtain one or more measurements of the at least one PRS when the at least one RIS is in the disabled state; and perform a second set of one or more measurements of the at least one PRS transmitted from the second UE in accordance with the PRS measurement schedule and the RIS schedule to obtain one or more measurements of the at least one PRS when the at least one RIS is in the enabled state.

In an aspect, a non-transitory computer-readable medium storing computer-executable instructions that, when executed by a first user equipment (UE), cause the first UE to: receive, from a second UE, an RIS schedule, wherein the RIS schedule indicates times when at least one RIS is in an enabled state and times when the at least one RIS is in a disabled state; send a request to a third UE to transmit at least one positioning reference signal (PRS), wherein the request indicates times when the at least one PRS is expected to be transmitted by the third UE; and perform a first set of one or more measurements of the at least one PRS transmitted from the third UE in accordance with the RIS schedule to make one or more measurements of the at least one PRS when the at least one RIS is in the disabled state; and perform a second set of one or more measurements of the at least one PRS from the third UE in accordance with the RIS schedule to make one or more measurements of the at least one PRS when the at least one RIS is in the enabled state.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
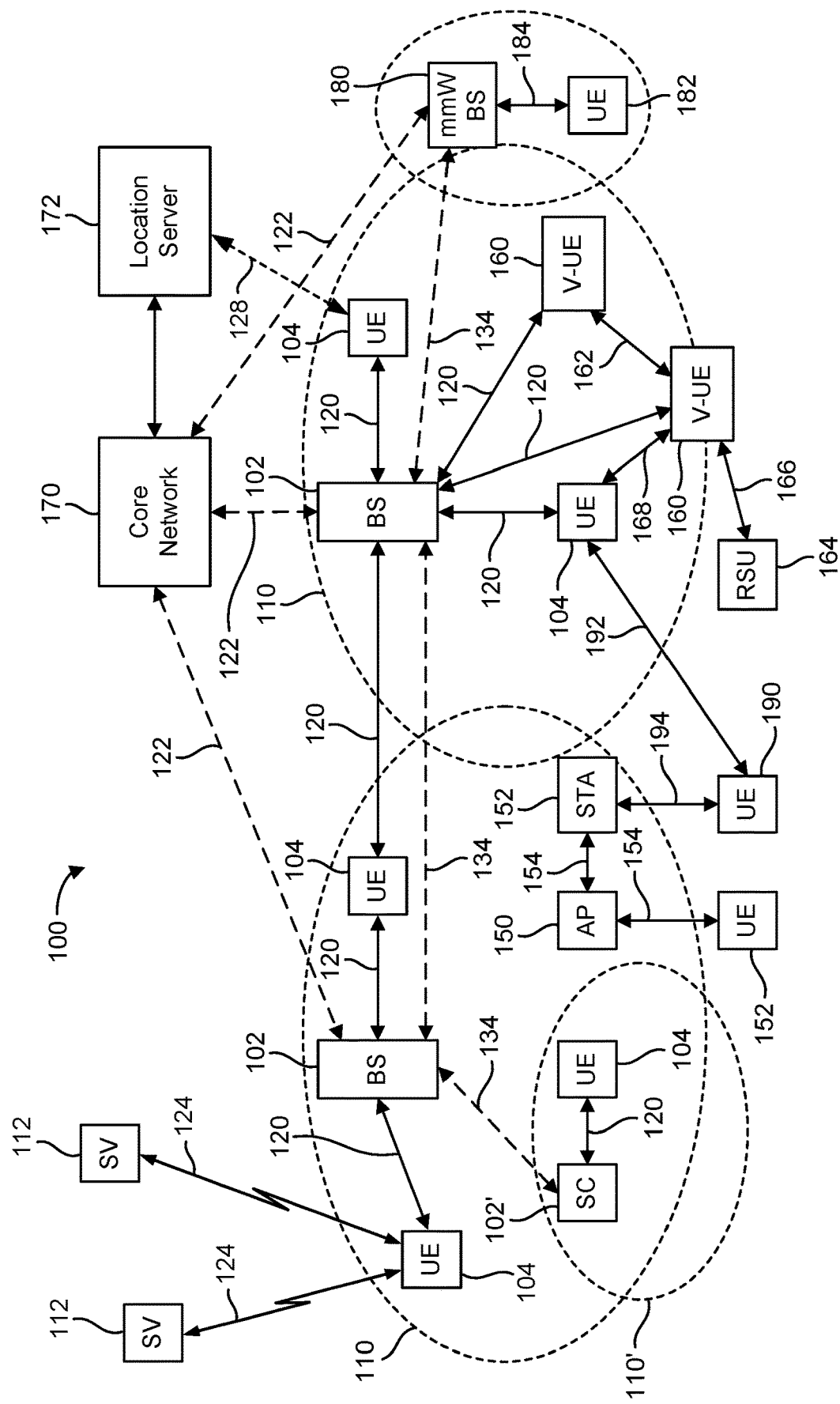
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either a UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low-power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to the core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a WLAN access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction.

Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the EHF band (30 GHz-300 GHz) which is identified by the International Telecommunications Union (ITU) as a "millimeter wave" band.

The frequencies between FR1 and FR2 are often referred to as mid-band frequencies.

Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first-generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by WLAN technologies, most notably IEEE 802.11x WLAN technologies generally referred to as "Wifi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
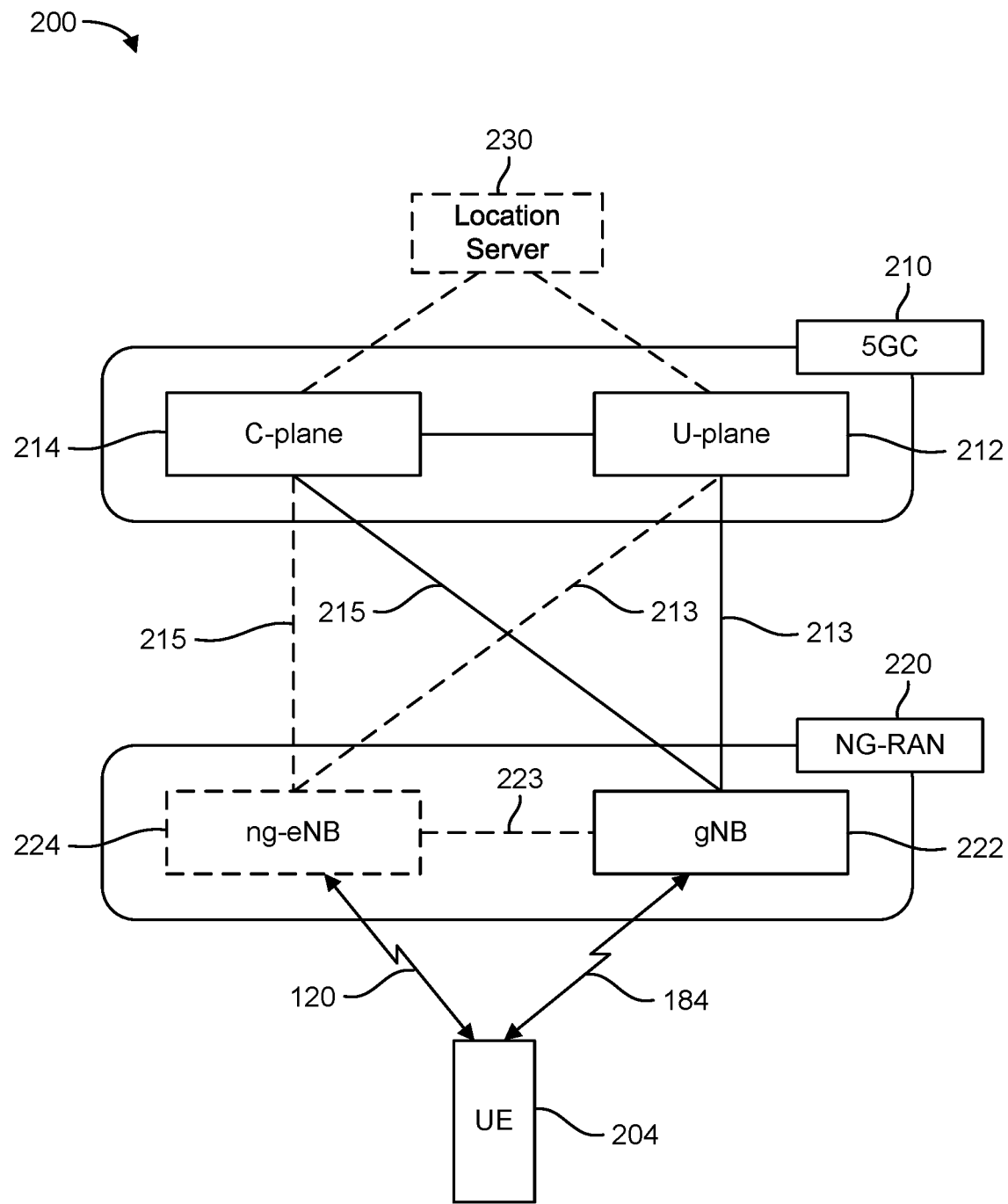
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, Internet protocol (IP) routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third-party server, such as an original equipment manufacturer (OEM) server or service server).

Figure 2B:
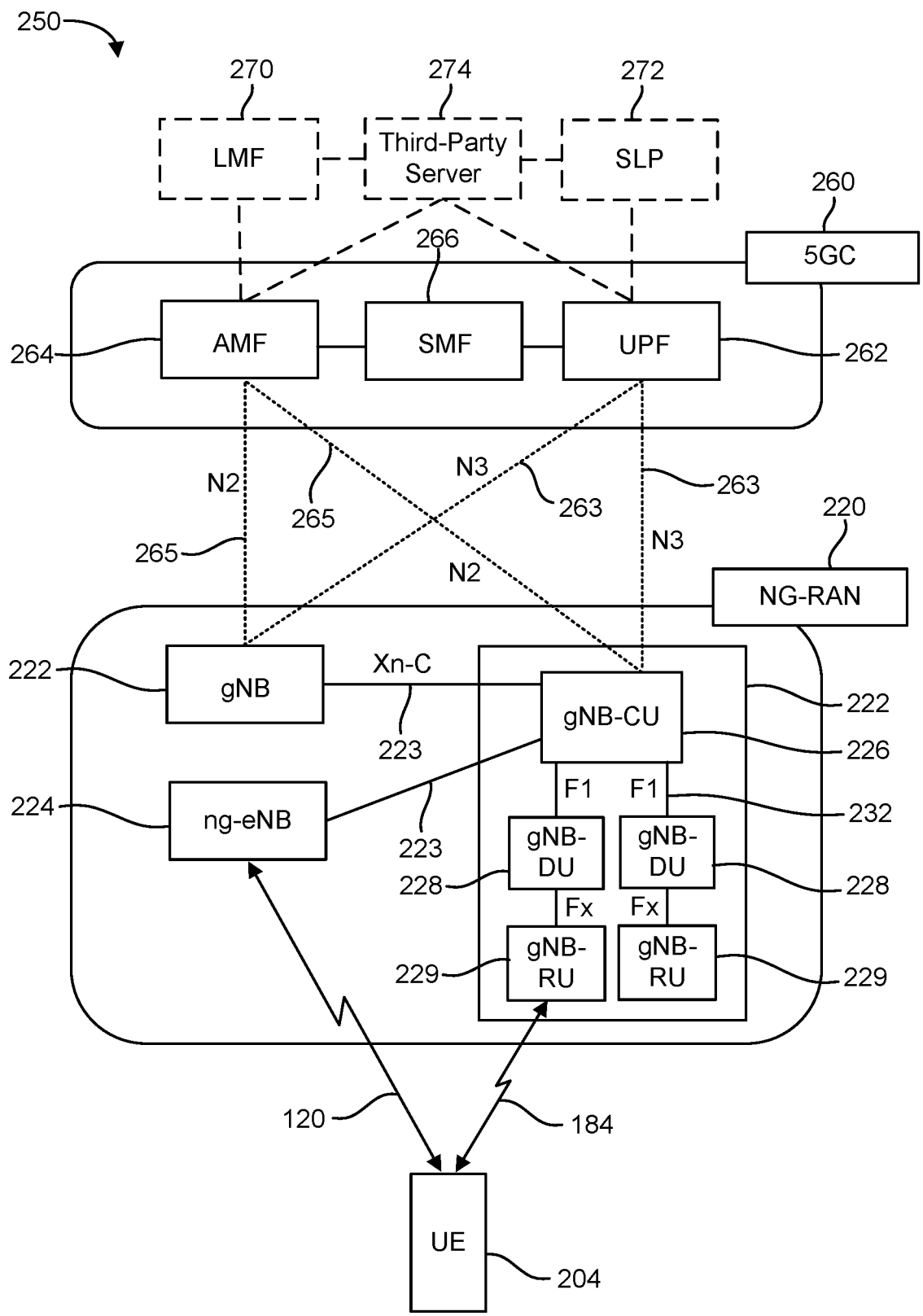

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE IP address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
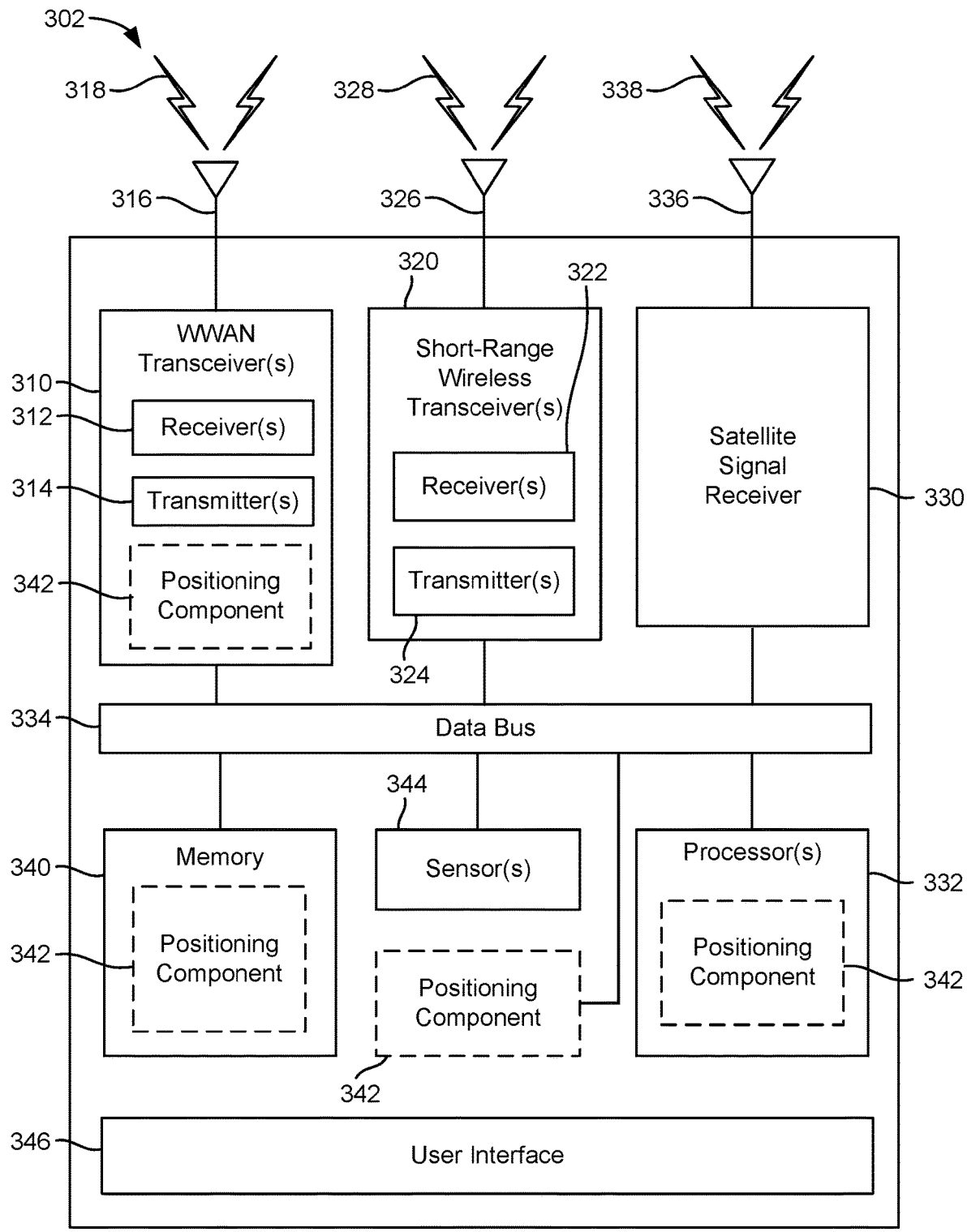
FIGS. 3A, 3B, and 3C are simplified block diagrams of several sample aspects of components that may be employed in a user equipment (UE), a base station, and a network entity, respectively, and configured to support communications as taught herein.
Figure 3B:
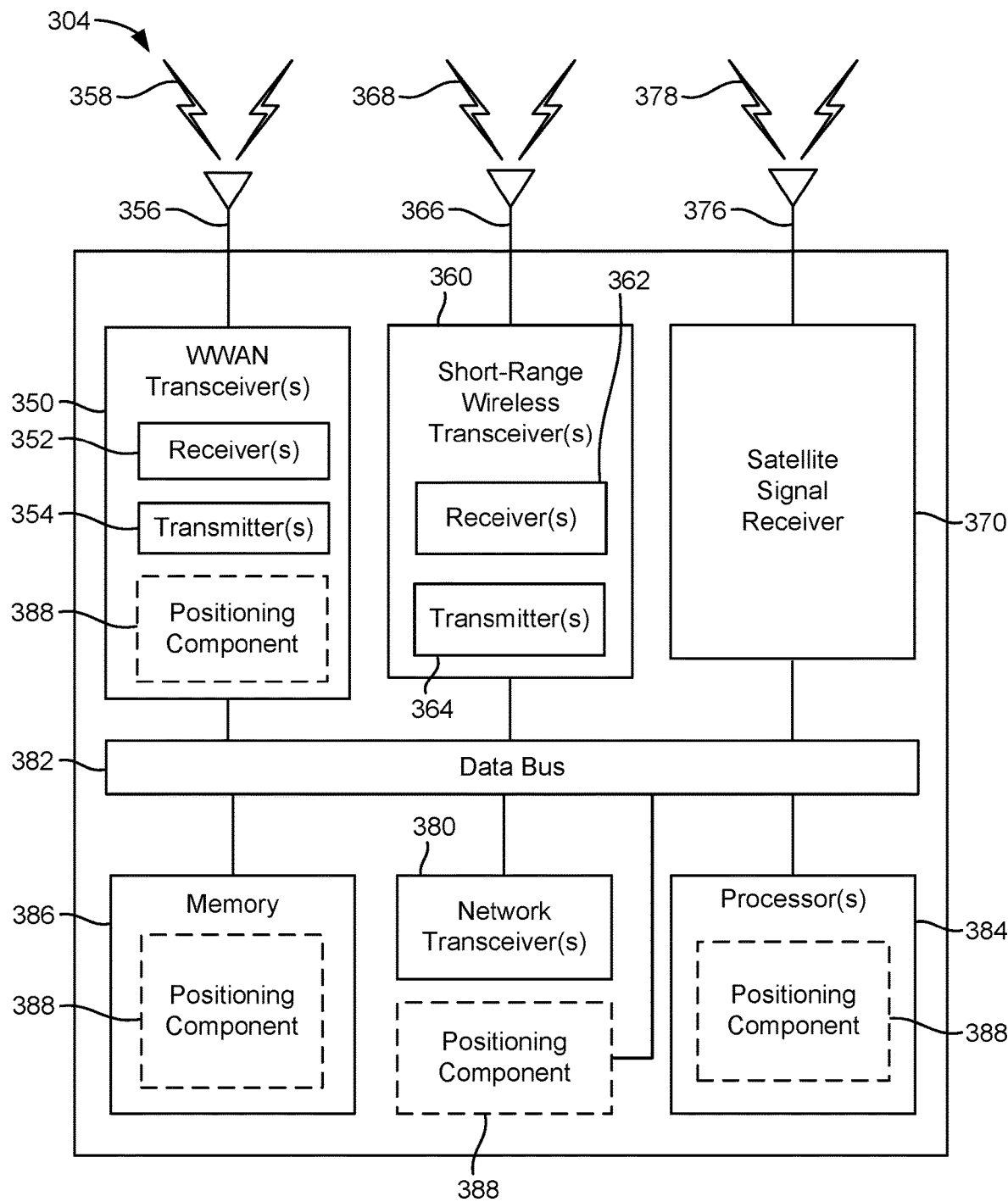
Figure 3C:
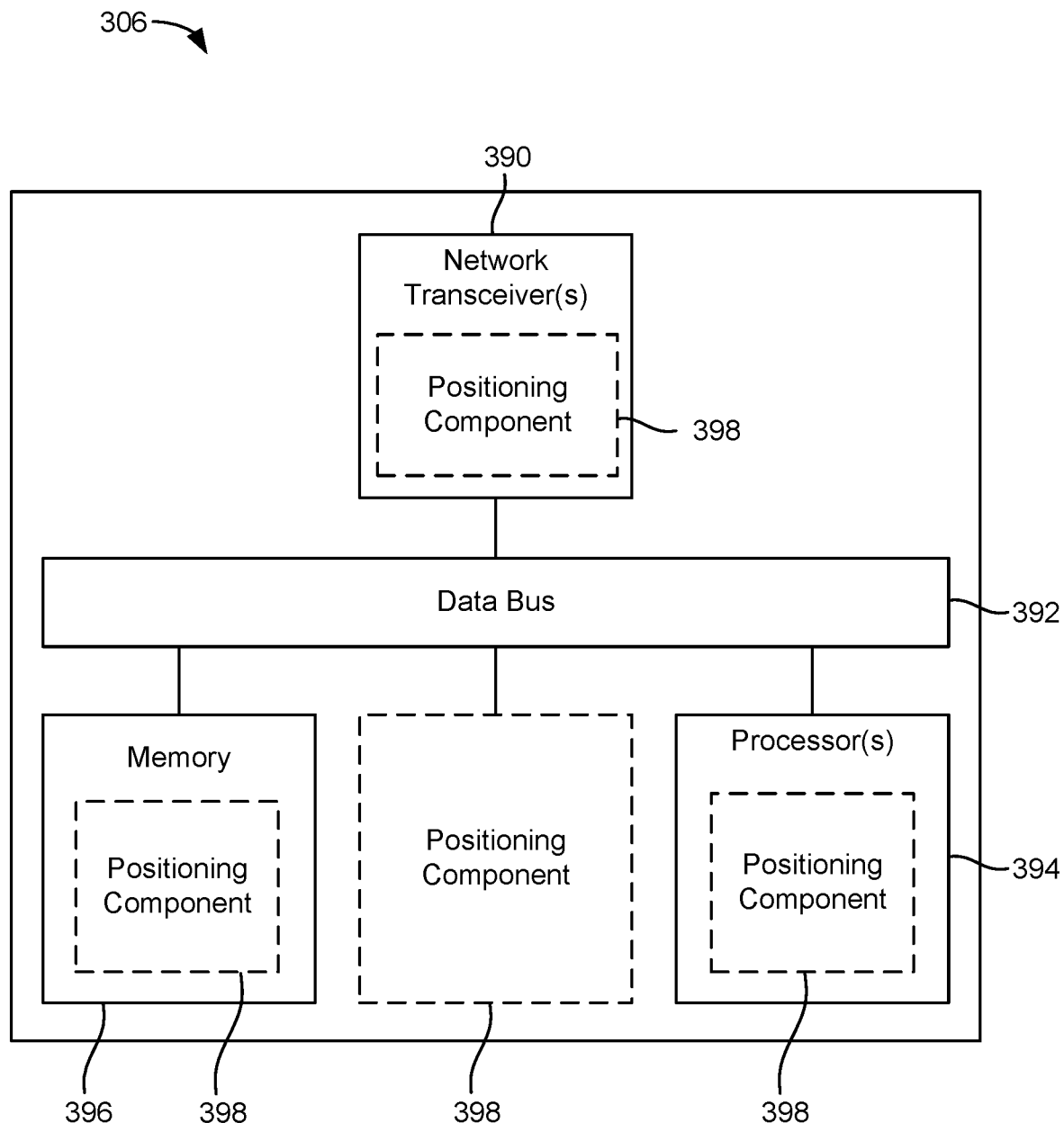

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, DSRC, wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be GPS signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are NTN receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general-purpose processors, multi-core processors, central processing units (CPUs), ASICs, digital signal processors (DSPs), field-programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a PDCP layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316.

The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have WiFi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a WiFi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG-RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
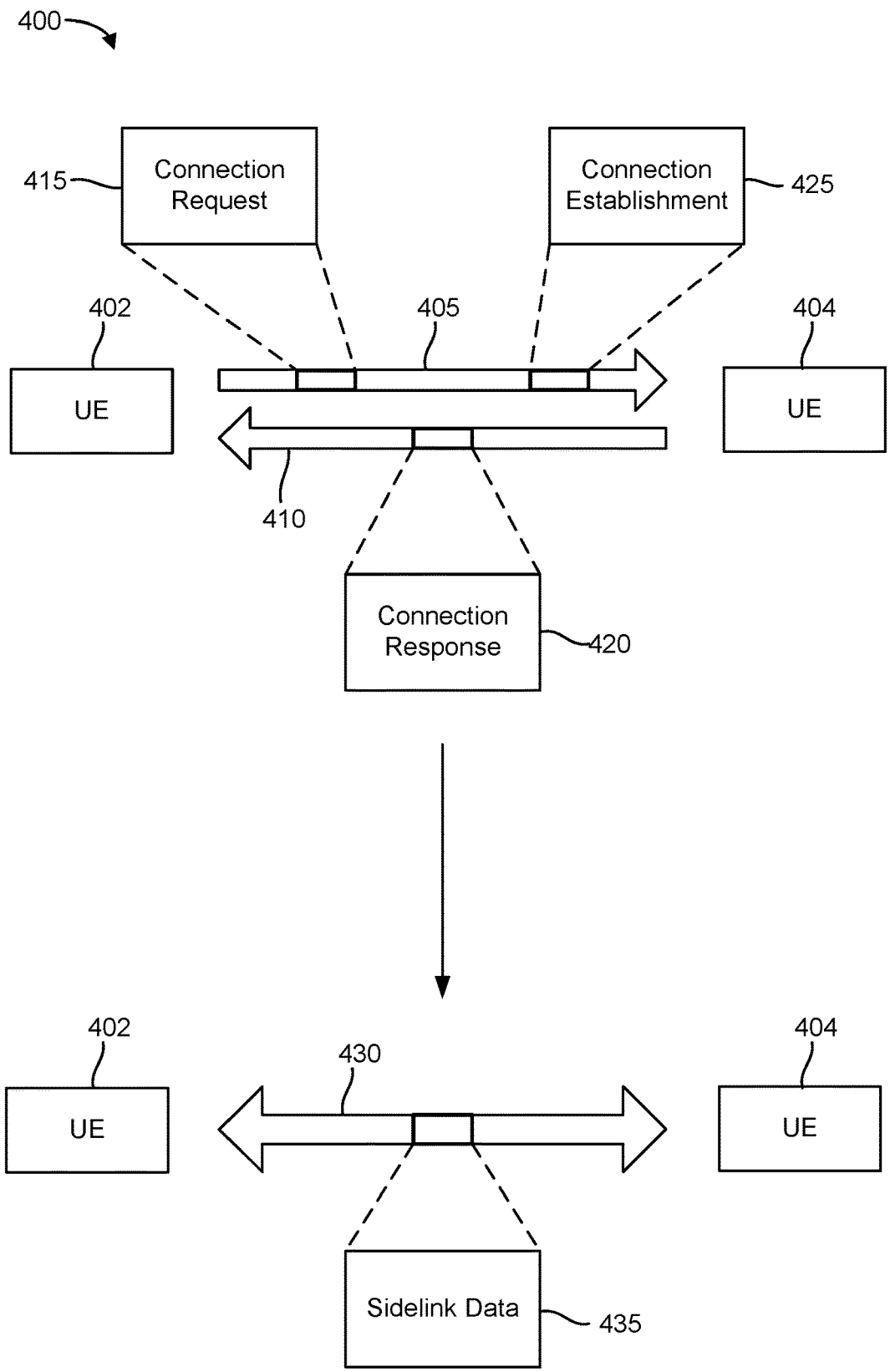
FIG. 4 illustrates an example of a wireless communications system that supports unicast sidelink establishment, according to aspects of the disclosure.

FIG. 4 illustrates an example of a wireless communications system 400 that supports wireless unicast sidelink establishment, according to aspects of the disclosure. In some examples, wireless communications system 400 may implement aspects of wireless communications systems 100, 200, and 250. Wireless communications system 400 may include a first UE 402 and a second UE 404, which may be examples of any of the UEs described herein. As specific examples, UEs 402 and 404 may correspond to V-UEs 160 in FIG. 1.

In the example of FIG. 4, the UE 402 may attempt to establish a unicast connection over a sidelink with the UE 404, which may be a V2X sidelink between the UE 402 and UE 404. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 402 may be referred to as an initiator UE that initiates the sidelink connection procedure, and the UE 404 may be referred to as a target UE that is targeted for the sidelink connection procedure by the initiator UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 402 and UE 404. For example, a transmission and reception capability matching may be negotiated between the UE 402 and UE 404. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 402 and UE 404. Additionally, a security association may be established between UE 402 and UE 404 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 402 and UE 404.

In some cases, UE 404 may create a service announcement (e.g., a service capability message) to transmit over a cellular network (e.g., cV2X) to assist the sidelink connection establishment. Conventionally, UE 402 may identify and locate candidates for sidelink communications based on a basic service message (BSM) broadcasted unencrypted by nearby UEs (e.g., UE 404). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 402 is able to detect the BSM(s). Accordingly, the service announcement transmitted by UE 404 and other nearby UEs (e.g., a discovery signal) may be an upper layer signal and broadcasted (e.g., in an NR sidelink broadcast). In some cases, the UE 404 may include one or more parameters for itself in the service announcement, including connection parameters and/or capabilities it possesses. The UE 402 may then monitor for and receive the broadcasted service announcement to identify potential UEs for corresponding sidelink connections. In some cases, the UE 402 may identify the potential UEs based on the capabilities each UE indicates in their respective service announcements.

The service announcement may include information to assist the UE 402 (e.g., or any initiator UE) to identify the UE transmitting the service announcement (UE 404 in the example of FIG. 4). For example, the service announcement may include channel information where direct communication requests may be sent. In some cases, the channel information may be RAT-specific (e.g., specific to LTE or NR) and may include a resource pool within which UE 402 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 402 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 404 in the example of FIG. 4), the initiator UE (UE 402 in the example of FIG. 4) may transmit a connection request 415 to the identified target UE 404. In some cases, the connection request 415 may be a first RRC message transmitted by the UE 402 to request a unicast connection with the UE 404 (e.g., an "RRCSetupRequest" message). For example, the unicast connection may utilize the PC5 interface for the sidelink, and the connection request 415 may be an RRC connection setup request message. Additionally, the UE 402 may use a sidelink signaling radio bearer 405 to transport the connection request 415.

After receiving the connection request 415, the UE 404 may determine whether to accept or reject the connection request 415. The UE 404 may base this determination on a transmission/reception capability, an ability to accommodate the unicast connection over the sidelink, a particular service indicated for the unicast connection, the contents to be transmitted over the unicast connection, or a combination thereof. For example, if the UE 402 wants to use a first RAT to transmit or receive data, but the UE 404 does not support the first RAT, then the UE 404 may reject the connection request 415. Additionally or alternatively, the UE 404 may reject the connection request 415 based on being unable to accommodate the unicast connection over the sidelink due to limited radio resources, a scheduling issue, etc. Accordingly, the UE 404 may transmit an indication of whether the request is accepted or rejected in a connection response 420. Similar to the UE 402 and the connection request 415, the UE 404 may use a sidelink signaling radio bearer 410 to transport the connection response 420. Additionally, the connection response 420 may be a second RRC message transmitted by the UE 404 in response to the connection request 415 (e.g., an "RRCResponse" message).

In some cases, sidelink signaling radio bearers 405 and 410 may be the same sidelink signaling radio bearer or may be separate sidelink signaling radio bearers. Accordingly, a radio link control (RLC) layer acknowledged mode (AM) may be used for sidelink signaling radio bearers 405 and 410. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 420 indicates that the UE 404 accepted the connection request 415, the UE 402 may then transmit a connection establishment 425 message on the sidelink signaling radio bearer 405 to indicate that the unicast connection setup is complete. In some cases, the connection establishment 425 may be a third RRC message (e.g., an "RRCSetupComplete" message). Each of the connection request 415, the connection response 420, and the connection establishment 425 may use a basic capability when being transported from one UE to the other UE to enable each UE to be able to receive and decode the corresponding transmission (e.g., the RRC messages).

Additionally, identifiers may be used for each of the connection request 415, the connection response 420, and the connection establishment 425. For example, the identifiers may indicate which UE 402/404 is transmitting which message and/or for which UE 402/404 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 415 and/or the connection response 420 for UE 402 and/or UE 404, respectively, to enable negotiation of corresponding AS layer parameters for the unicast connection. For example, the UE 402 and/or UE 404 may include PDCP parameters in a corresponding unicast connection setup message to set a PDCP context for the unicast connection. In some cases, the PDCP context may indicate whether or not PDCP duplication is utilized for the unicast connection. Additionally, the UE 402 and/or UE 404 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 402 and/or UE 404 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 402 and/or UE 404 may include PHY layer parameters when establishing the unicast connection to set a PHY layer context for the unicast connection. For example, the PHY layer context may indicate a transmission format (unless transmission profiles are included for each UE 402/404) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 425 message is transmitted). Before a security association (e.g., security context) is established between the UE 402 and UE 404, the sidelink signaling radio bearers 405 and 410 may not be protected. After a security association is established, the sidelink signaling radio bearers 405 and 410 may be protected. Accordingly, the security context may enable secure data transmissions over the unicast connection and the sidelink signaling radio bearers 405 and 410. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 404 may base its decision on whether to accept or reject the connection request 415 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 402 and UE 404 may communicate using the unicast connection over a sidelink 430, where sidelink data 435 is transmitted between the two UEs 402 and 404. The sidelink 430 may correspond to sidelinks 162 and/or 168 in FIG. 1. In some cases, the sidelink data 435 may include RRC messages transmitted between the two UEs 402 and 404. To maintain this unicast connection on sidelink 430, UE 402 and/or UE 404 may transmit a keep alive message (e.g., "RRCLinkAlive" message, a fourth RRC message, etc.). In some cases, the keep alive message may be triggered periodically or on-demand (e.g., event-triggered). Accordingly, the triggering and transmission of the keep alive message may be invoked by UE 402 or by both UE 402 and UE 404. Additionally or alternatively, a MAC control element (CE) (e.g., defined over sidelink 430) may be used to monitor the status of the unicast connection on sidelink 430 and maintain the connection. When the unicast connection is no longer needed (e.g., UE 402 travels far enough away from UE 404), either UE 402 and/or UE 404 may start a release procedure to drop the unicast connection over sidelink 430. Accordingly, subsequent RRC messages may not be transmitted between UE 402 and UE 404 on the unicast connection.

Figure 5:
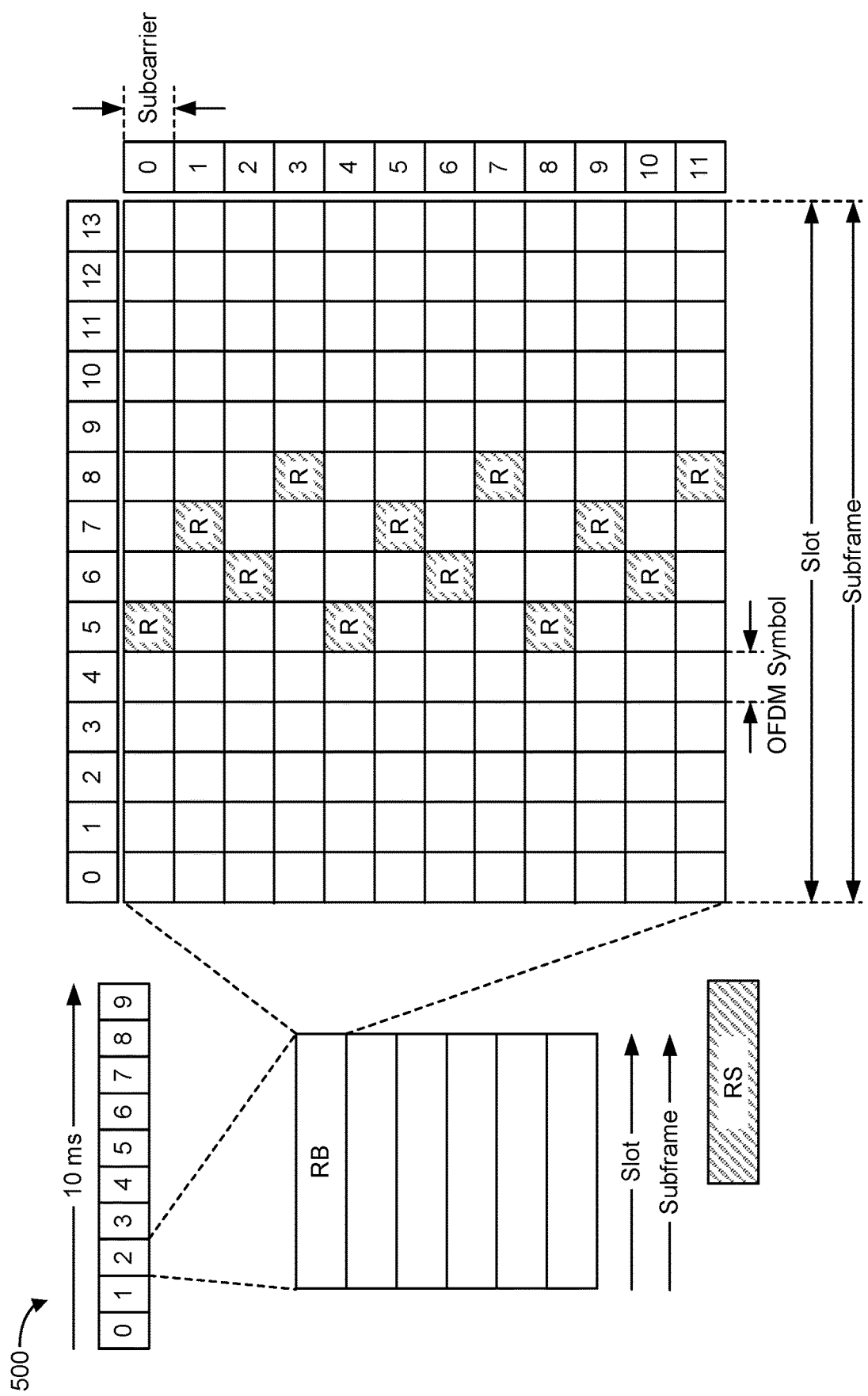
FIG. 5 is a diagram illustrating an example frame structure, according to aspects of the disclosure.

Various frame structures may be used to support downlink and uplink transmissions between network nodes (e.g., base stations and UEs). FIG. 5 is a diagram 500 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 5, a numerology of 15 kHz is used. Thus, in the time domain, a 10 ms frame is divided into 10 equally sized subframes of 1 ms each, and each subframe includes one time slot. In FIG. 5, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 5, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 5 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb-size (also referred to as the "comb density"). A comb-size 'N' represents the subcarrier spacing (or frequency/tone spacing) within each symbol of a PRS resource configuration.

Specifically, for a comb-size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 5 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 5); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu$ {4, 5, 8, 10, 16, 20, 32, 40, 64, 80, 160, 320, 640, 1280, 2560, 5120, 10240} slots, with $\mu$=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance,"

a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time-of-arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round-trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell-ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
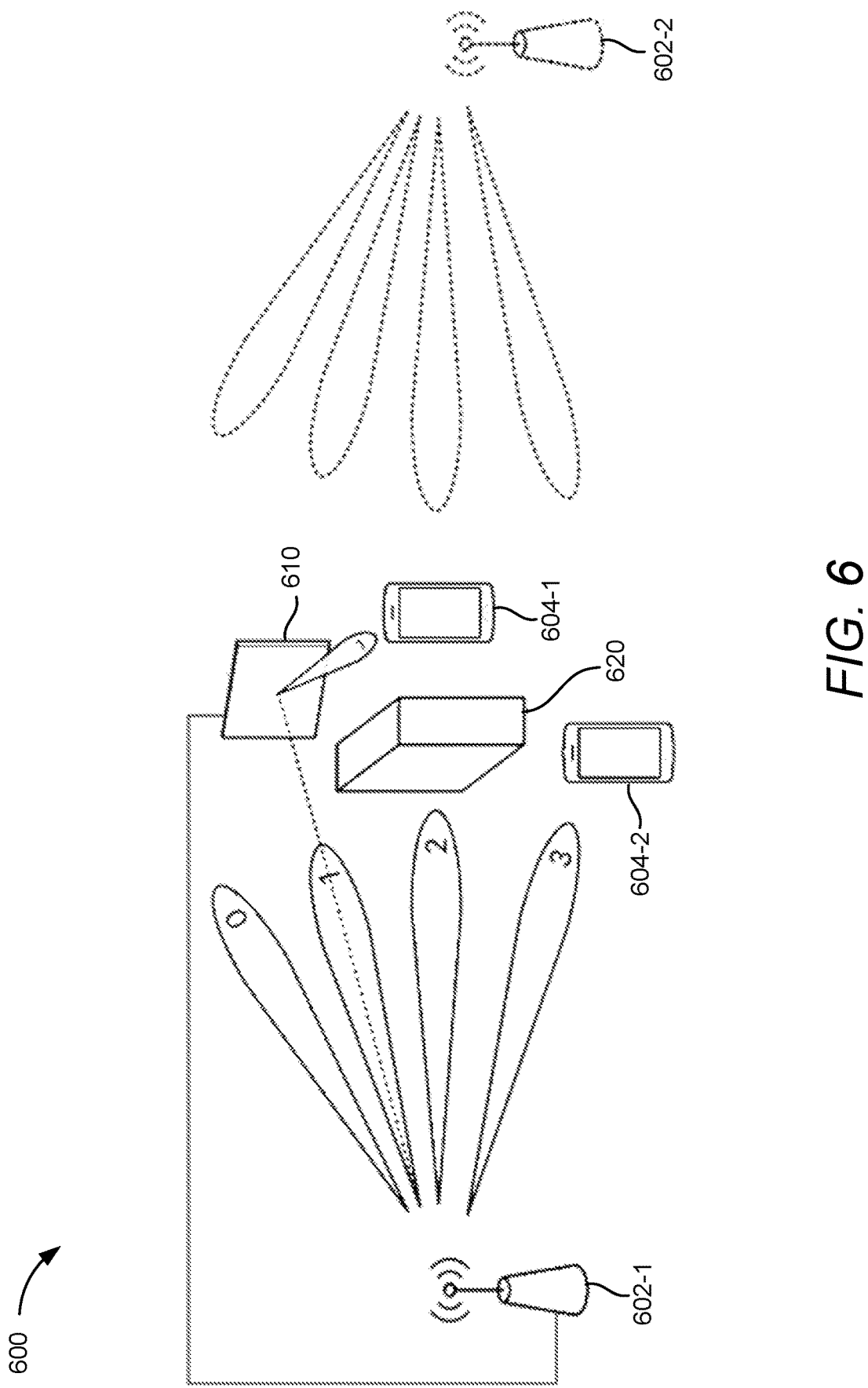
FIG. 6 illustrates an example system for wireless communication using a reconfigurable intelligent surface (RIS), according to aspects of the disclosure.

FIG. 6 illustrates an example system 600 for wireless communication using a reconfigurable intelligent surface (RIS) 610, according to aspects of the disclosure. An RIS (e.g., RIS 610) is a two-dimensional surface comprising a large number of low-cost, low-power near-passive reflecting elements whose properties are reconfigurable (by software) rather than static. For example, by carefully tuning the phase shifts of the reflecting elements (using software), the scattering, absorption, reflection, and diffraction properties of an MS can be changed over time. In that way, the electromagnetic (EM) properties of an RIS can be engineered to collect wireless signals from a transmitter (e.g., a base station, a UE, etc.) and passively beamform them towards a target receiver (e.g., another base station, another UE, etc.). In the example of FIG. 6, a first base station 602-1 controls the reflective properties of an MS 610 in order to communicate with a first UE 604-1.

The goal of RIS technology is to create smart radio environments, where the wireless propagation conditions are co-engineered with the physical layer signaling. This enhanced functionality of the system 600 can provide technical benefits in a number of scenarios.

As a first example scenario, as shown in FIG. 6, the first base station 602-1 (e.g., any of the base station described herein) is attempting to transmit downlink wireless signals to the first UE 604-1 and a second UE 604-2 (e.g., any two of the UEs described herein, collectively, UEs 604) on a plurality of downlink transmit beams, labeled "0," "1," "2," and "3." However, unlike the second UE 604-2, because the first UE 604-1 is behind an obstacle 620 (e.g., a building, a hill, or another type of obstacle), it cannot receive the wireless signal on what would otherwise be the line-of-sight (LOS) beam from the first base station 602-1, that is, the downlink transmit beam labeled "2." In this scenario, the first base station 602-1 may instead use the downlink transmit beam labeled "1" to transmit the wireless signal to the RIS 610, and configure the MS 610 to reflect/beamform the incoming wireless signal towards the first UE 604-1. The first base station 602-1 can thereby transmit the wireless signal around the obstacle 620.

Note that the first base station 602-1 may also configure the MS 610 for the first UE's 604-1 use in the uplink. In that case, the first base station 602-1 may configure the MS 610 to reflect an uplink signal from the first UE 604-1 to the first base station 602-1, thereby enabling the first UE 604-1 to transmit the uplink signal around the obstacle 620.

As another example scenario in which system 600 can provide a technical advantage, the first base station 602-1 may be aware that the obstacle 620 may create a "dead zone," that is, a geographic area in which the downlink wireless signals from the first base station 602-1 are too attenuated to be reliably detected by a UE within that area (e.g., the first UE 604-1). In this scenario, the first base station 602-1 may configure the RIS 610 to reflect downlink wireless signals into the dead zone in order to provide coverage to UEs that may be located there, including UEs about which the first base station 602-1 is not aware.

An RIS (e.g., RIS 610) may be designed to operate in either a first mode (referred to as "Mode 1"), in which the RIS operates as a reconfigurable mirror, or a second mode (referred to as "Mode 2"), in which the RIS operates as a receiver and transmitter (similar to the amplify and forward functionality of a relay node). Some RIS may be designed to be able to operate in either Mode 1 or Mode 2, while other RIS may be designed to operate only in either Mode 1 or Mode 2. Mode 1 RIS are assumed to have a negligible hardware group delay, whereas Mode 2 RIS have a non-negligible hardware group delay due to being equipped with limited baseband processing capability. Because of their greater processing capability compared to Mode 1 RIS, Mode 2 MS may, in some cases, be able to compute and report their transmission-to-reception (Tx-Rx) time difference measurements (i.e., the difference between the time a signal is reflected towards a UE and the time the signal is received back from the UE). In the example of FIG. 6, the MS 610 may be either a Mode 1 or Mode 2 MS.

FIG. 6 also illustrates a second base station 602-2 that may transmit downlink wireless signals to one or both of the UEs 604. As an example, the first base station 602-1 may be a serving base station for the UEs 604 and the second base station 602-2 may be a neighboring base station. The second base station 602-2 may transmit downlink positioning reference signals to one or both of the UEs 604 as part of a positioning procedure involving the UE(s) 604. Alternatively or additionally, the second base station 602-2 may be a secondary cell for one or both of the UEs 604. In some cases, the second base station 602-2 may also be able to reconfigure the RIS 610, provided it is not being controlled by the first base station 602-1 at the time.

Note that while FIG. 6 illustrates one MS 610 and one base station controlling the MS 610 (i.e., the first base station 602-1), the first base station 602-1 may control multiple RIS 610. In addition, the MS 610 may be controlled by multiple base stations 602 (e.g., both the first and second base stations 602-1 and 602-2, and possibly more).

Figure 7:
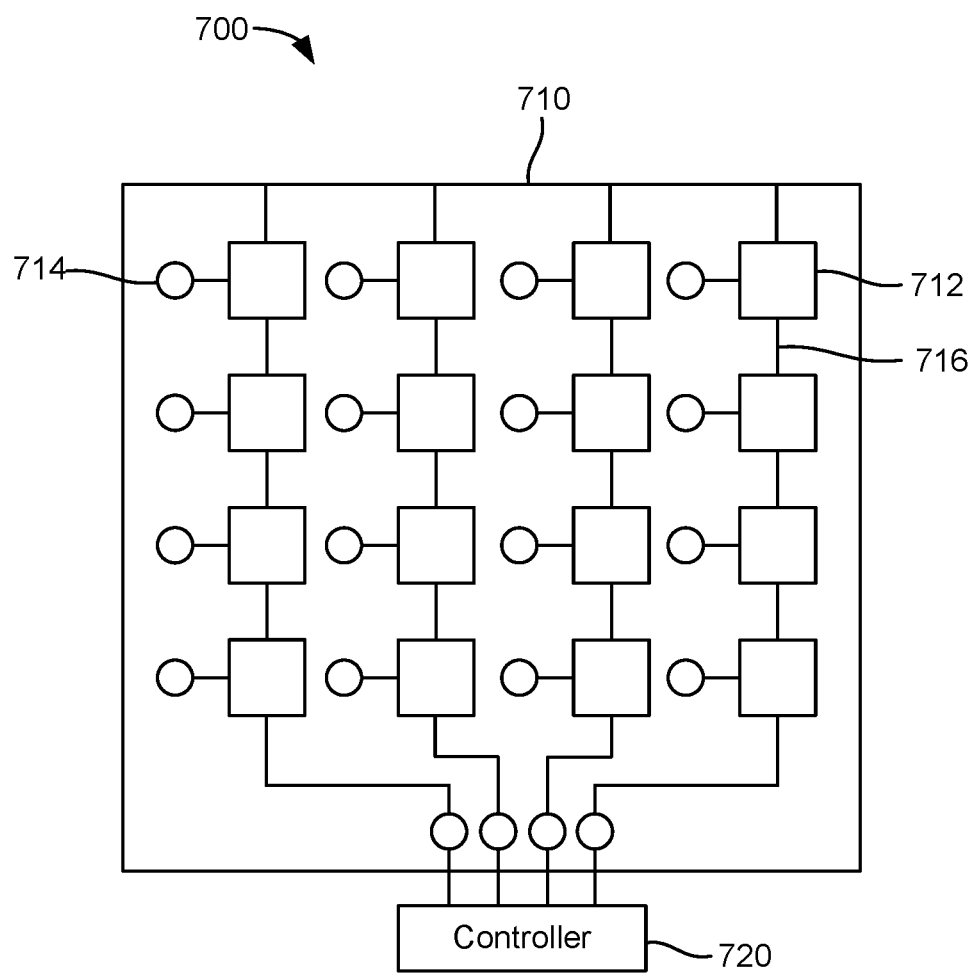
FIG. 7 is a diagram of an example architecture of a RIS, according to aspects of the disclosure.

FIG. 7 is a diagram of an example architecture of a RIS 700, according to aspects of the disclosure. The RIS 700, which may correspond to MS 610 in FIG. 6, may be a Mode 1 MS. As shown in FIG. 7, the MS 700 primarily consists of a planar surface 710 and a controller 720. The planar surface 710 may be constructed of one or more layers of material. In the example of FIG. 7, the planar surface 710 may consist of three layers. In this case, the outer layer has a large number of reflecting elements 712 printed on a dielectric substrate to directly act on the incident signals. The middle layer is a copper panel to avoid signal/energy leakage. The last layer is a circuit board that is used for tuning the reflection coefficients of the reflecting elements 712 and is operated by the controller 720. The controller 720 may be a low-power processor, such as a FPGA.

In a typical operating scenario, the optimal reflection coefficients of the MS 700 is calculated at the base station (e.g., the first base station 602-1 in FIG. 6), and then sent to the controller 720 through a dedicated feedback link. The design of the reflection coefficients depends on the channel state information (CSI), which is only updated when the CSI changes, which is on a much longer time scale than the data symbol duration. As such, low-rate information exchange is sufficient for the dedicated control link, which can be implemented using low-cost copper lines or simple, cost-efficient wireless transceivers.

Each reflecting element 712 is coupled to a positive-intrinsic negative (PIN) diode 714. In addition, a biasing line 716 connects each reflecting element 712 in a column to the controller 720. By controlling the voltage through the biasing line 716, the PIN diodes 714 can switch between 'on' and 'off' modes. This can realize a phase shift difference of $\pi$ (pi) in radians. To increase the number of phase shift levels, more PIN diodes 714 can be coupled to each reflecting element 712.

An MS, such as MS 700, has important advantages for practical implementations. For example, the reflecting elements 712 only passively reflect the incoming signals without any sophisticated signal processing operations that would require RF transceiver hardware. As such, compared to conventional active transmitters, the MS 700 can operate with several orders of magnitude lower costs in terms of hardware and power consumption. Additionally, due to the passive nature of the reflecting elements 712, an MS 700 can be fabricated with light weight and limited layer thickness, and as such, can be readily installed on a wall, a ceiling, signage, a street lamp, etc. Further, the RIS 700 naturally operates in full-duplex (FD) mode without self-interference or introducing thermal noise. Therefore, it can achieve higher spectral efficiency than active half-duplex (HD) relays, despite their lower signal processing complexity than that of active FD relays requiring sophisticated self-interference cancelation.

NR is capable of supporting various sidelink ranging and positioning techniques. Sidelink-based ranging enables the determination of the relative distance(s) between UEs and optionally their absolute position(s), where the absolute position of at least one involved UE is known. This technique is valuable in situations where global navigation satellite system (GNSS) positioning is degraded or unavailable (e.g., tunnels, urban canyons, etc.) and can also enhance range and positioning accuracy when GNSS is available. Sidelink-based ranging can be accomplished using a three-way handshake for session establishment, followed by the exchange of positioning reference signals (PRS), and concluded by messaging to exchange measurements based on PRS transmission and receipt from peer UEs.

Sidelink ranging is based on calculating an inter-UE round-trip-time (RTT) measurement, as determined from the transmit and receive times of PRS (a wideband positioning signal defined in LTE and NR). Each UE reports an RTT measurement to all other participating UEs, along with its location (if known). For UEs having zero or inaccurate knowledge of their location, the RTT procedure yields an inter-UE range between the involved UEs. For UEs having accurate knowledge of their location, the range yields an absolute position. UE participation, PRS transmission, and subsequent RTT calculation is coordinated by an initial three-way messaging handshake (a PRS request, a PRS response, and a PRS confirmation), and a message exchange after PRS transmission (post PRS messages) to share measurements after receiving a peer UE's PRS.

Figure 8:
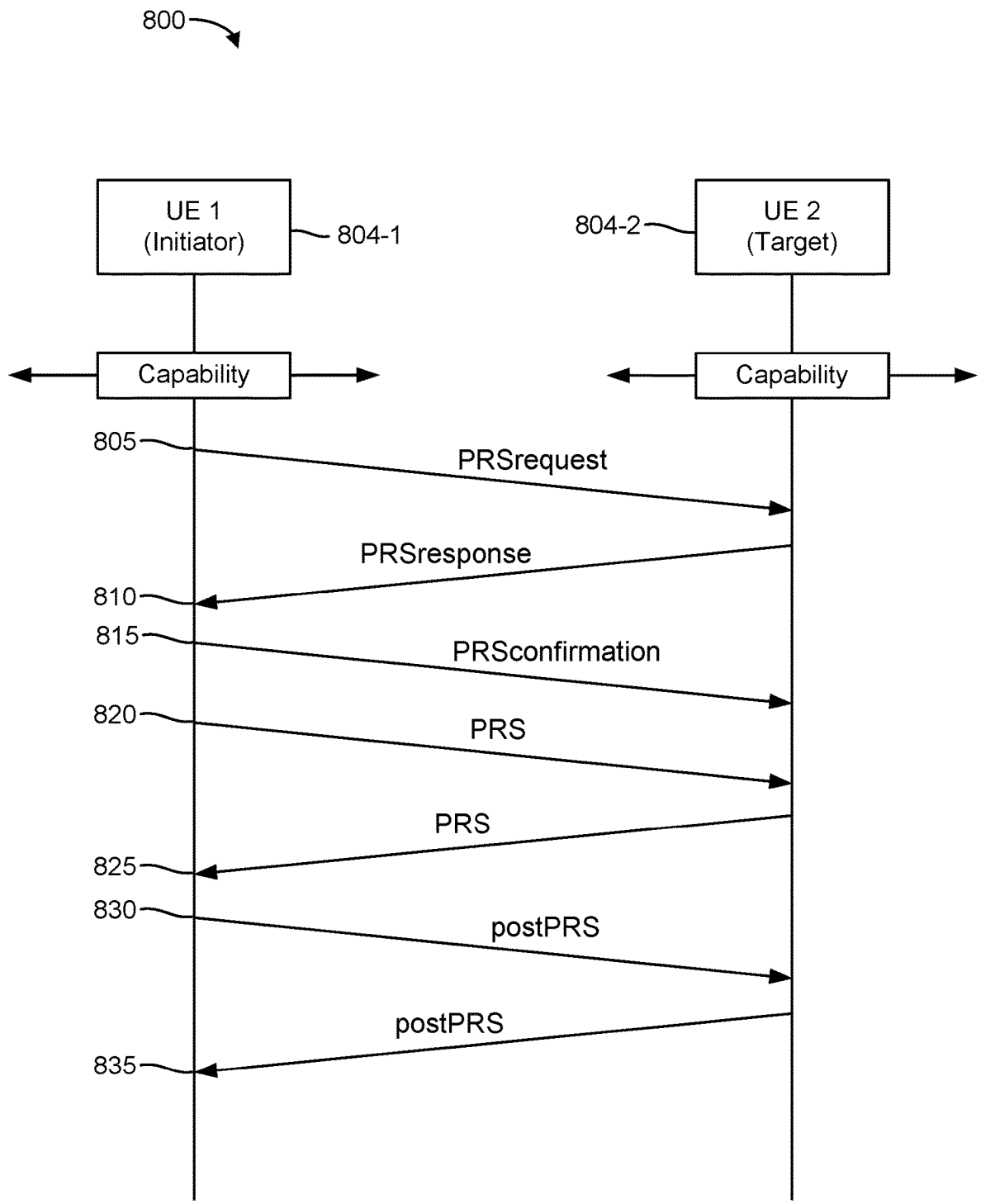
FIG. 8 is a diagram illustrating an example sidelink ranging and positioning procedure, according to aspects of the disclosure.

FIG. 8 is a diagram 800 illustrating an example sidelink ranging and positioning procedure, according to aspects of the disclosure. The procedure (or session) begins with the initial three-way messaging handshake after the broadcast of capability information by the involved peer UEs. At stage 805, the initiator UE 804-1 (e.g., any of the UEs described herein) transmits a PRS request ("PRSrequest") to a target UE 804-2 (e.g., any other of the UEs described herein). At stage 810, the target UE 804-2 transmits a PRS response ("PRSresponse") to the initiator UE 804-1. At stage 815, the initiator UE 804-1 transmits a PRS confirmation to the target UE 804-2. At this point, the initial three-way messaging handshake is complete.

At stages 820 and 825, the involved peer UEs 804 transmit PRS to each other. The resources on which the PRS are transmitted may be configured/allocated by the network (e.g., one of the UE's 804 serving base stations) or negotiated by the UEs 804 during the initial three-way messaging handshake. The initiator UE 804-1 measures the transmission-to-reception (Tx-Rx) time difference between the transmission time of PRS at stage 820 and the reception time of PRS at stage 825. The target UE 804-2 measures the reception-to-transmission (Rx-Tx) time difference between the reception time of PRS at stage 820 and the transmission time of PRS at stage 825.

At stages 830 and 835, the UE 804 exchange their respective time difference measurements. Each UE 804 is then able to determine the RTT between each UE 804 based on the Tx-Rx and Rx-Tx time difference measurements (specifically, the difference between the Tx-Rx and Rx-Tx time difference measurements). Based on the RTT measurement and the speed of light, each UE 804 can then estimate the distance between the two UEs 804 (specifically, half the RTT measurement multiplied by the speed of light). Note that while FIG. 8 illustrates two UEs 804, a UE may perform, or attempt to perform, the sidelink ranging and positioning procedure illustrated in FIG. 8 with multiple UEs.

Figure 9:
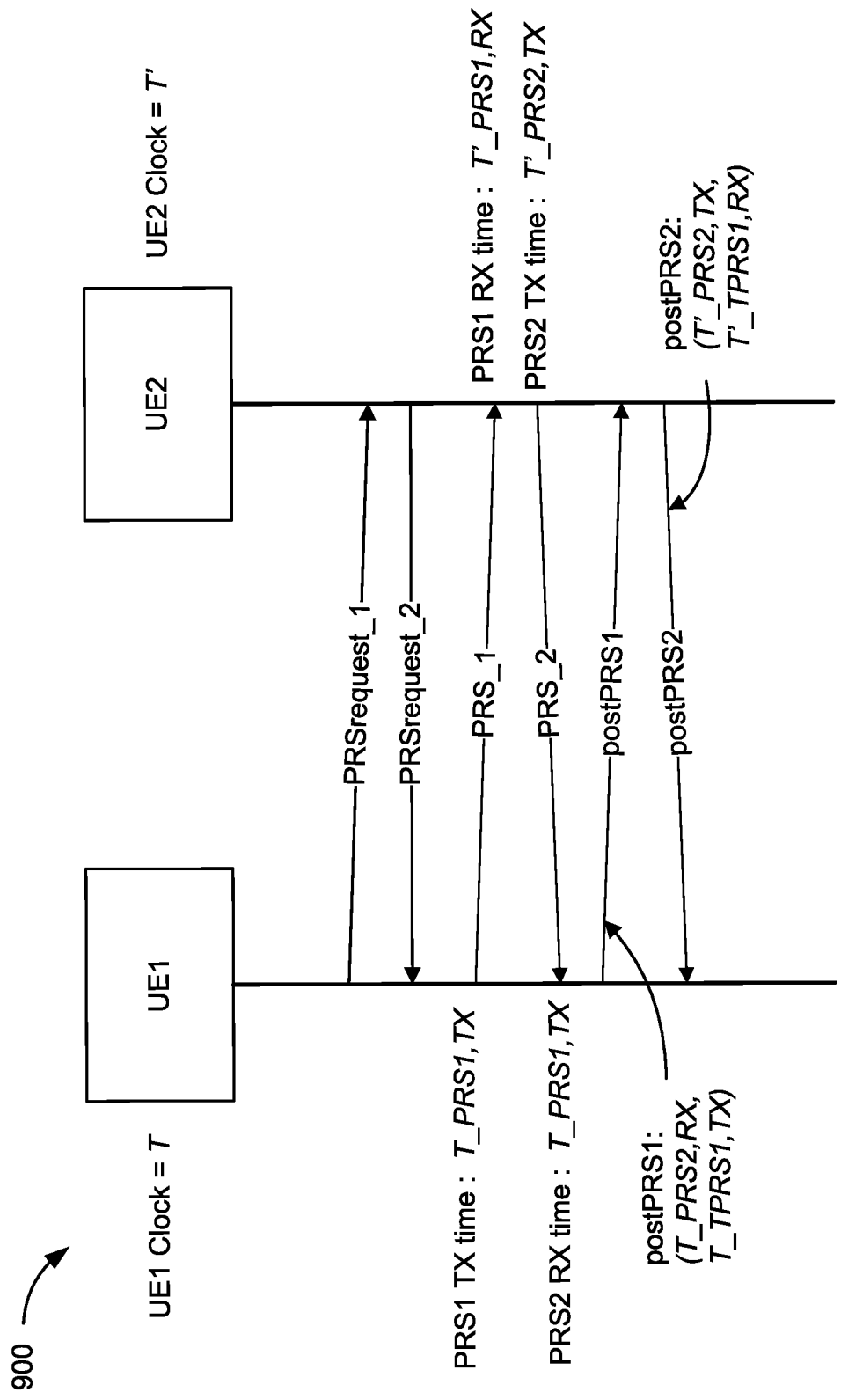
FIG. 9 depicts example operations of round-trip time (RTT) sidelink positioning between two UEs.

FIG. 9 depicts example operations 900 of RTT sidelink positioning between two UEs and extends FIG. 8 to show more detailed operations and measurements that take place during RTT sidelink positioning. In FIG. 9, and all subsequent figures, subscripts associated with various parameters in the text will be shown following an underscore ("_") in the figures. For example, "PRSrequest$_1$" is shown in FIG. 8 as "PRSrequest$_1$." Similarly "$T_{PRS1,TX}$" is shown as "T_PRS1,TX." This convention applies throughout the figures and any text following "_" in the figures should be interpreted as an equivalent of applying a subscript to the text.

In the example shown in FIG. 9, two UEs, labeled "UE1" and "UE2," have non-synchronized clocks, shown as clock=T for UE1 and clock=T' for UE2. Positioning is initiated when UE1 and UE2 exchange requests for transmission of PRS resources. In response to the request from UE2, UE1 transmits a PRS resource $PRS_1$ at a time $T_{TPRS1,TX}$ using the clock T of UE1 as the time base. UE2 receives $PRS_1$ at a time $T'_{TPRS1,RX}$ using the clock of UE2 as the time base. Similarly, in response to the request from UE1, UE2 transmits a PRS resource $PRS_2$ at a time $T'_{TPRS2,TX}$ using the clock T' of UE2 as the time base. UE1 receives $PRS_2$ at a time $T_{TPRS2,RX}$ using the clock T of UE1 as the time base. UE2 may determine the one-way-time-of-flight of $PRS_1$ as follows:

$$\Delta T_{TPRS1} = PRS_1 \text{ one-way-time-of-flight} =$$
$$(PRS_1 \text{ Rx time} - PRS_1 \text{ Tx time}) = (T'_{TPRS1, Rx} - T'_{TPRS1, Tx})$$

Similarly, UE1 may determine the one-way-time-of-flight of $PRS_2$ as follows:

$$\Delta T_{TPRS2} = PRS_2 \text{ one-way-time-of-flight} =$$
$$(PRS_2 \text{ Rx time} - PRS_2 \text{ Tx time}) = (T'_{TPRS2, Rx} - T'_{TPRS2, Tx})$$

After transmitting their respective PRS resources, UE1 and UE2 report times associated with the transmission and reception of the PRS in postPRS reports. In this example, UE1 sends the time it received $PRS_2$ from UE2 $T_{TPRS2,RX}$ and the time it transmitted $PRS_1$ to UE2 $T_{TPRS1,TX}$ in report $postPRS_1$. Similarly, UE2 sends the time it received $PRS_2$ from UE2 $T'_{TPRS2,RX}$ and the time it transmitted $PRS_2$ to UE1 $T'_{TPRS2,TX}$ in report $postPRS_2$. With the information in the report, the RTT may be determined as follows:

$$RTT = \Delta T_{TPRS1} + \Delta T_{TPRS2} = T'_{TPRS1,Rx} - T_{TPRS1,Tx} + T_{TPRS2,Rx} - T'_{TPRS2,Tx} =$$
$$T'_{TPRS1,Rx} - T'_{TPRS2,Tx} + T_{TPRS2,Rx} - T_{TPRS1,Tx}$$

Figure 10:
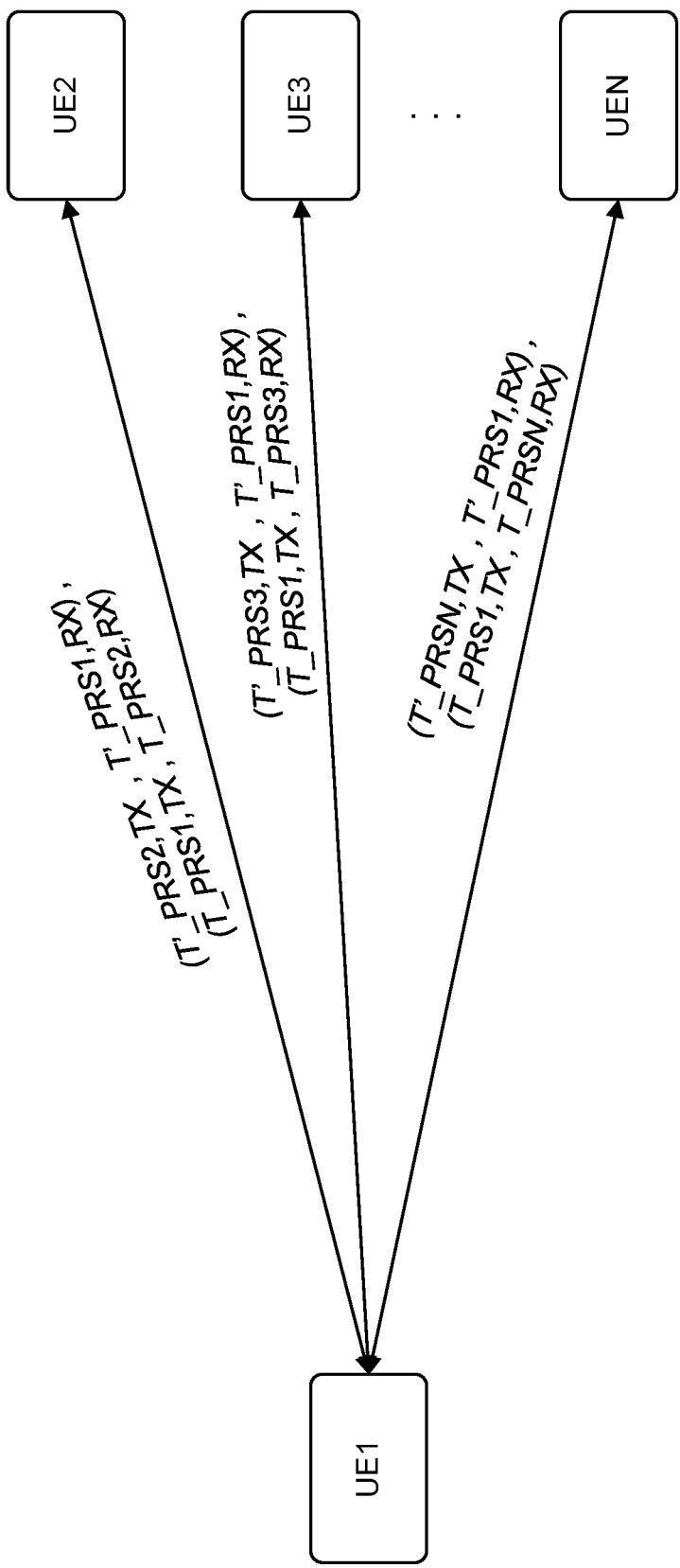
FIG. 10 is an example of how the operations shown in FIG. 9 may be extended to include additional UEs.

FIG. 10 is an example of how the operations shown in FIG. 9 may be extended to include additional UEs. In this example, each target UE (labeled "UE2," "UE3," through "UEN") transmits at least one PRS resource that is measured by UE1. Likewise, each target UE measures at least one PRS resource that is transmitted by UE1. The PRS measurement of each PRS resource made by UE1 is sent to the target UE that transmitted the PRS resource along with the time-of-transmission of the PRS resource transmitted by UE1. Each target UE also sends to UE1 the PRS measurements made by the target UE of the transmitted by UE1 along with the time-of-transmission of the PRS resource transmitted by the target UE. This results in the exchange of time-of-transmission and time-of-arrival data (e.g., (($T'_{PRS2,TX}$, $T'_{PRS1,RX}$), ($T_{PRS1,TX}$, $T_{PRS2,RX}$) through ($T'_{PRSN,TX}$, $T'_{PRS1,RX}$), ($T_{PRS1,Tx}$, $T_{PRSN,RX}$)) that is used to determine the RTT between UE1 and each target UE.

As noted, positioning environments may include one or more RIS with known positions. In accordance with certain aspects of the disclosure, such RIS may be used by UEs in sidelink positioning operations to enhance the accuracy of the UE position determinations. To this end, certain aspects of the disclosure determine RIS schedules indicating instances during which one or more of the RIS in the positioning environment is enabled/disabled. Such RIS schedules should be known to the UEs that calculate parameters such as the time of arrival/range/position with respect to other UEs. If the UEs do not know whether an RIS is enabled or disabled, they will not be able to determine whether the measurements they make correspond to measurements of a direct path from another UE or measurements of a reflective path from an MS. With knowledge of the MS schedules, a UE may determine which measurements correspond to direct paths but also may obtain additional measurements corresponding to reflected paths thereby providing the UE with more information in making its positioning determinations. For example, armed with this additional information, a UE may use the known positions of the MS to determine its own position more accurately.

Figure 11A:
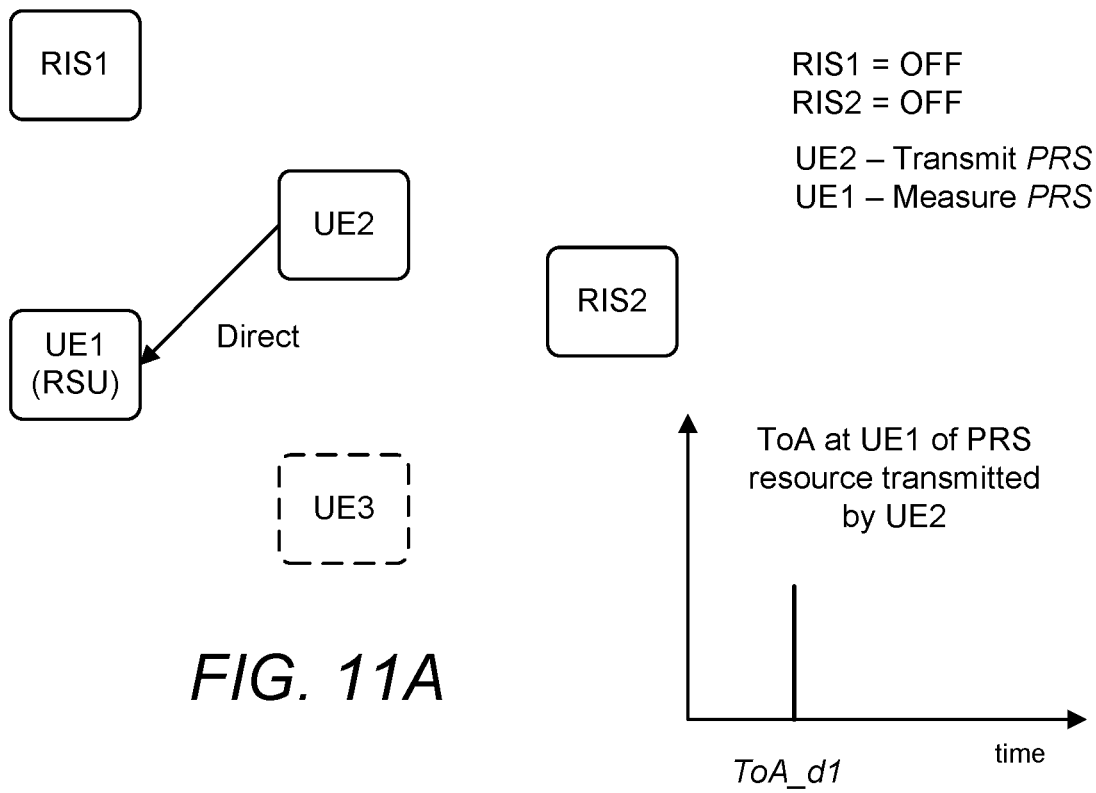
FIGS. 11A, 11B, and 11C show example positioning operations in accordance with certain aspects of the disclosure.
Figure 11B:
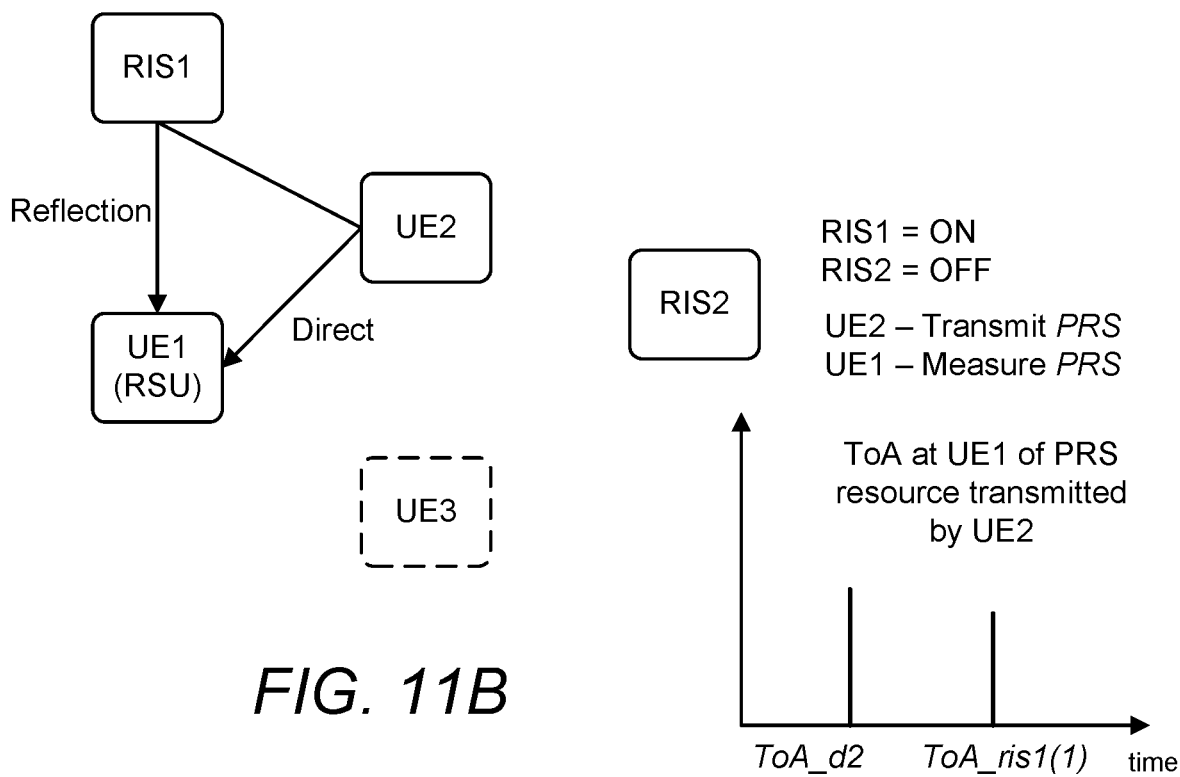
Figure 11C:
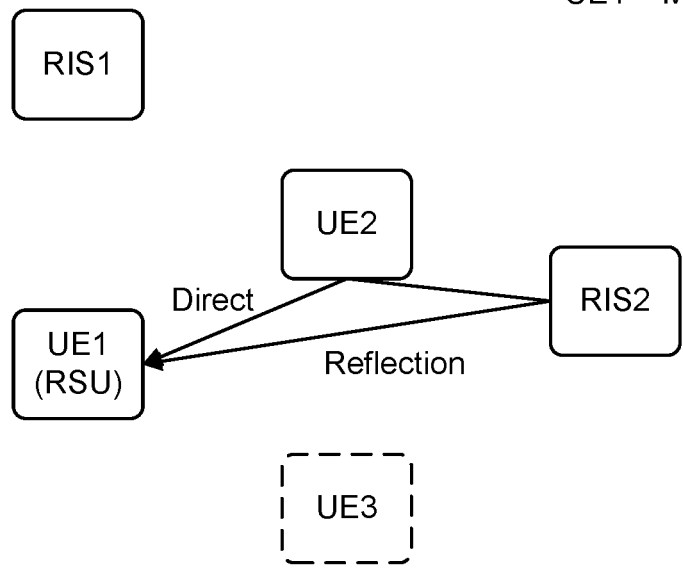
Figure 11C:
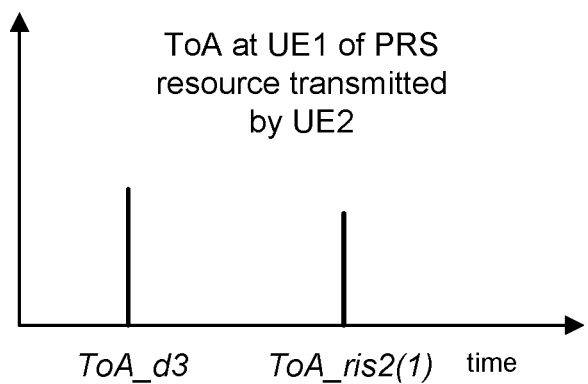

FIGS. 11A, 11B, and 11C (collectively, FIG. 11) show example positioning operations in accordance with certain aspects of the disclosure. In this example, an initiator UE determines MS schedules for enabling and disabling the MS and controls the MS in accordance with the schedules. The initiator UE also indicates time instants to each participating UE for transmission of its PRS.

FIG. 11, the positioning environment includes multiple UEs (labeled "UE1," "UE2," and "UE3") and multiple RIS (labeled "RIS1" and "RIS2"). In an aspect, UE1 may be an RSU. UE1 controls the RIS enablement and disablement at every measurement interval in accordance with an MS schedule. UE1 also indicates the PRS transmission schedule for the participating UEs (UE2, UE3) and may coordinate the PRS transmission schedules with the MS schedule so that each PRS may be measured in instances in which one or more MS are enabled as well as instances in which one or more MS are disabled. For example, based on the enabled/disabled times indicated in the MS schedule, UE1 may indicate time instants $\{t_1^{UE2}, t_2^{UE2}, t_3^{UE2}, \ldots\}$ to UE2 to transmit its PRS, and time instants $\{t_1^{UE3}, t_2^{UE3}, t_3^{UE3}, \ldots\}$ to UE3 to transmit its PRS. Here, time instants $\{t_1^{UE2}, t_2^{UE2}, t_3^{UE2}, \ldots\}/\{t_1^{UE3}, t_2^{UE3}, t_3^{UE3}, \ldots\}$, correspond to arbitrary time indices. For example, UE2 could be scheduled on time resource $\{0, k, 2k, \ldots\}$, UE3 scheduled on time resources $\{1, k+1, 2k+1, \ldots\}$ and so on.

In addition to indicating the PRS transmission schedule for participating UEs (UE2, UE3, UEN), UE1 may also indicate whether channel coherence should be assumed among the different instances in the PRS transmission schedule. With the RIS disabled, repeated transmissions of a PRS in time can be averaged and used to estimate clock drift or to mitigate the effect of clock drift. To use the repeated transmissions of the PRS in this manner, channel coherence is needed. As such, in addition to indicating the times allocated to the responders UE2, . . . UEN for transmission of their PRS, UE1 may also provide channel coherence windows [h1, h2], [h2+1, h3], etc., indicating when the channel over which the PRS are coherent (i.e., the channel is a coherent channel). Such channel coherence windows are signaled by UE1 and indicate when the RIS are in a disabled state. During the channel coherence windows, the participating UEs may make and average multiple PRS measurements over the channel coherence windows. Channel coherence is not assumed when RIS within the positioning environments are in and enabled state.

In the example shown in FIG. 11, UE1 is the initiator UE in that it initiates the position session. Also, in this example, UE1 controls (i.e., enables and disables) RIS1 and RIS2 and adjusts the PRS transmission schedule of participating UEs, UE2 and UE3, to calculate positioning. It is noted that there may be other examples in which the initiator UE does not control the MS. Such examples are discussed herein in connection with FIG. 15.

In an aspect, UE1 may determine a schedule for RIS1 in which RIS1 is enabled at scheduled times $\{t_1^1, t_2^1, t_3^1, \ldots\}$ and disabled at scheduled times $\{f_1^1, f_2^1, f_3^1, \ldots\}$. Additionally, UE1 may determine a schedule for RIS2 in which RIS2 is enabled at scheduled times $\{t_1^2, t_2^2, t_3^2, \ldots\}$ and disabled at scheduled times $\{f_1^2, f_2^2, f_3^2, \ldots\}$. Further, UE1 schedules the transmission of PRS by the UEs within the positioning environment (e.g., $\{t_1^{UE2}, t_2^{UE2}, t_3^{UE2}, \ldots\}$ for UE2, and $\{t_1^{UE3}, t_2^{UE3}, t_3^{UE3}, \ldots\}$ for UE3).

In FIG. 11A, RIS1 and RIS2 are both disabled when UE1 requests that UE2 transmit a PRS. During times when RIS1 and RIS2 are disabled, UE1 performs ranging measurement of the PRS received from UE2 using direct LOS ToA. As shown in FIG. 11A, UE1 receives the PRS transmission along a direct path from UE2 at $ToA_{d1}$.

In FIG. 11B, UE1 has enabled RIS1, but RIS2 remains disabled. Accordingly, UE1 receives the PRS along the direct path at time $ToA_{d2}$ and along a reflected path from RIS1 at time $ToA_{ris1(1)}$. During instances when RIS1 is enabled, UE1 performs ranging measurement of UE2 using the LOS ToA ($ToA_{d2}$) and the reflected path ToA ($ToA_{ris1(1)}$) from RIS1. In an aspect, UE1 calculates the range to UE2 ($R_{UE1,UE2}$) using measurements from $ToA_{d1}$ and $ToA_{d2}$. Further, UE1 calculates the range of UE2 to RIS1 ($R_{UE2,RIS1}$) by accounting for the range between UE1 and RIS1, as the positions of UE1, RIS1 are known. Letting $t_{tx}$ be the transmission time of the PRS by UE2, $$R_{UE2,RIS1} = (ToA_{ris(1)} - t_{tx}) - \frac{\|p_{UE_1} - p_{RIS_1}\|}{c},$$

where $p_{UE1}$, $p_{RIS1}$ are positions of UE1, RIS1, respectively.

Additionally, or in the alternative, UE1 may disable RIS1 and enable RIS2, as shown in FIG. 11C. As shown, UE1 receives the PRS along the direct path at time $ToA_{d3}$ and along a reflected path from RIS2 at time $ToA_{ris2(1)}$. During times when RIS2 is enabled, UE1 performs ranging measurement of UE2 using the LOS ToA ($ToA_{d3}$) and the reflected path ToA ($ToA_{ris2(1)}$) from RIS2.

Similar methods can be used to calculate the range parameters with respect to RIS2, ($R_{UE2,UE1}$, $R_{UE2,RIS2}$), when RIS2 is enabled/disabled. Given the absolute positions of UE1, RIS1, RIS2, and the calculated range parameters ($R_{UE1,UE2}$, $R_{UE2,RIS1}$, $R_{UE2,RIS2}$), the position of UE2 can be solved.

Figure 12A:
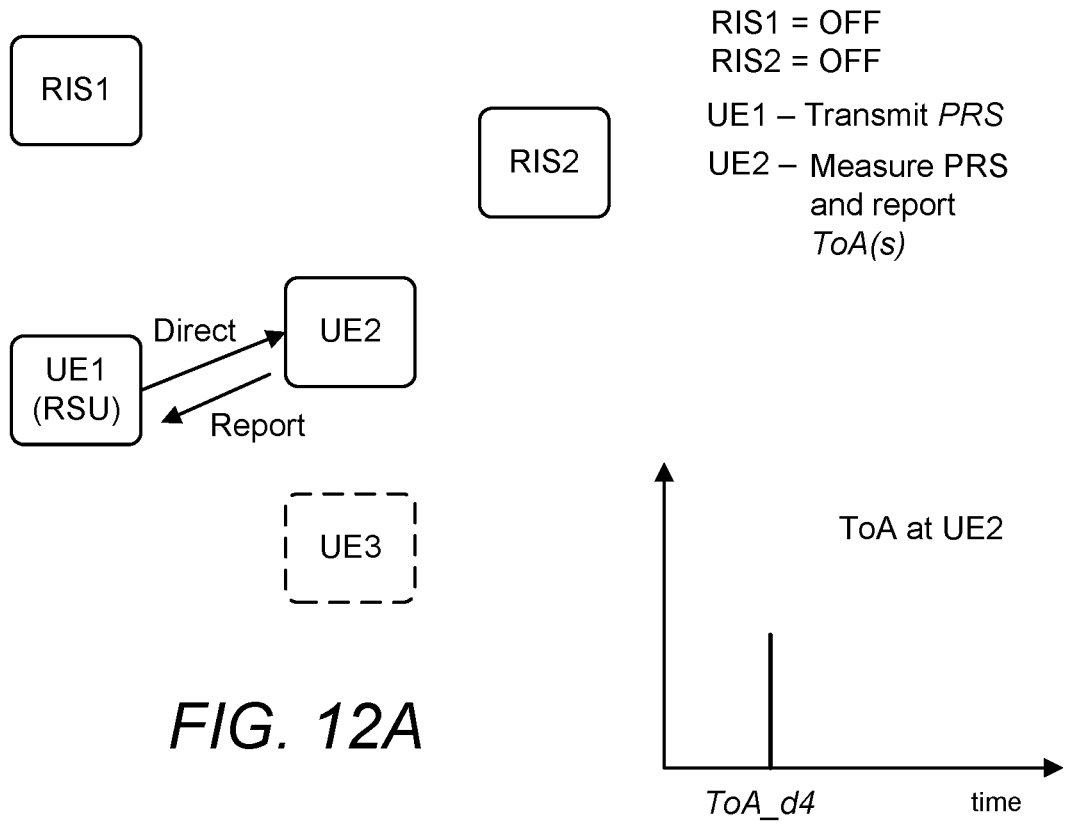
FIGS. 12A, 12B, and 12C show example positioning operations in accordance with certain aspects of the disclosure.
Figure 12B:
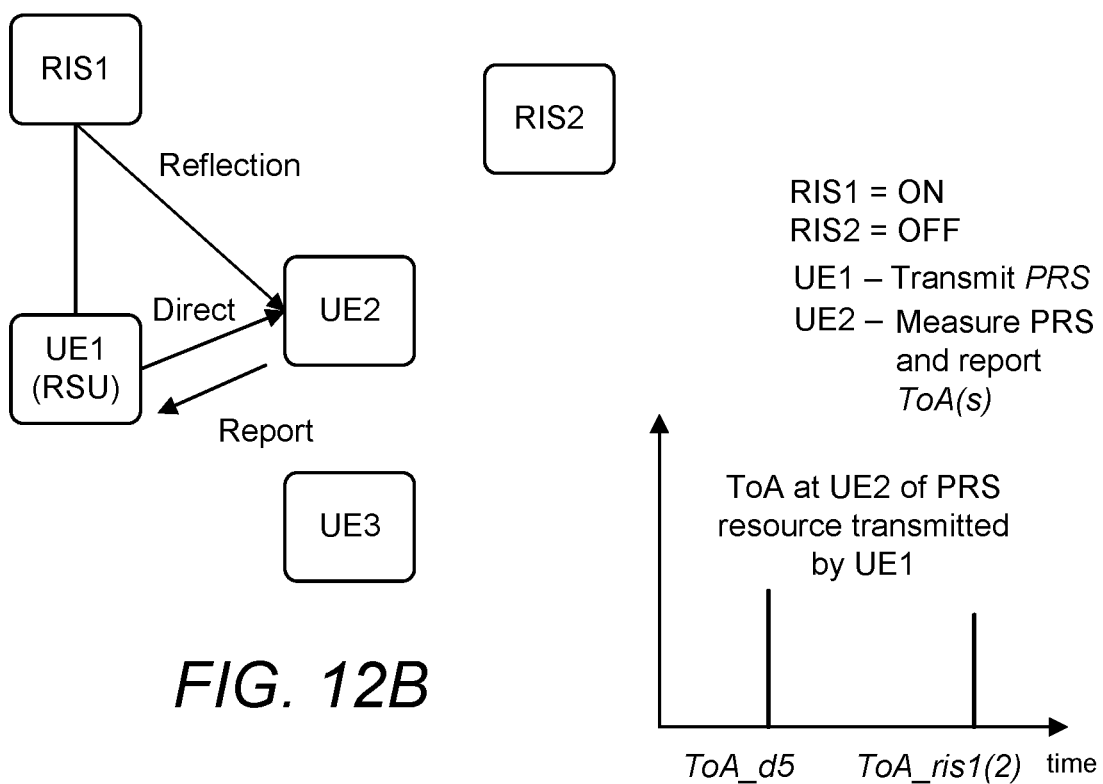
Figure 12C:
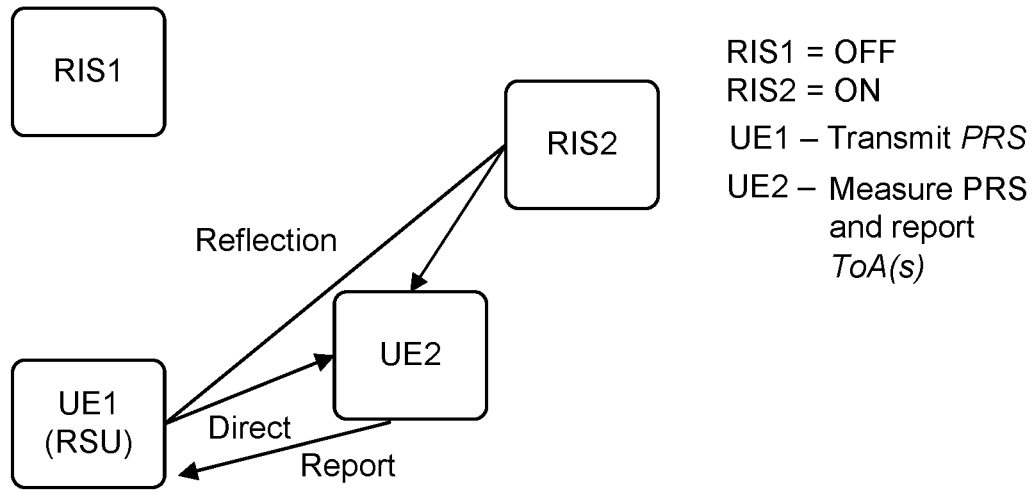
Figure 12C:
Figure 12C:
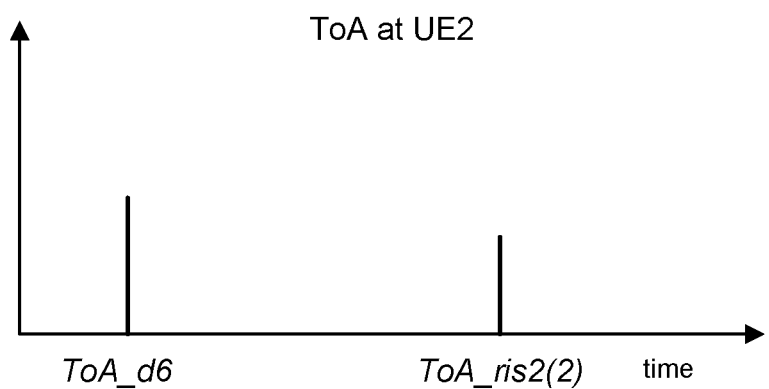

In accordance with certain aspects of the disclosure, PRS transmissions from an initiator UE are measured by participating UEs, which report the measurements to the initiator UE. The PRS transmissions and measurements are coordinated with the enabling and disabling of RIS in the positioning environment. FIGS. 12A, 12B, and 12C (collectively, FIG. 12) show example positioning operations in accordance with such aspects of the disclosure. In FIG. 12, the positioning environment includes multiple UEs (labeled "UE1," "UE2," and "UE3") and multiple RIS (labeled "RIS1" and "RIS2"). In an aspect, UE1 may be an RSU.

In accordance with certain aspects of the disclosure, UE1 performs scheduled PRS transmissions and indicates, to participating UEs (e.g., UE2 and UE3), reporting parameters that are to be provided by the participating UEs. UE1 calculates the position of the participating UEs based on the reported parameters provided to UE1 from the participating UEs.

In accordance with certain aspects, during time instants $\{t_1, t_3, t_4, t_6 \ldots\}$ when the RIS in the positioning environment are disabled, UE1 transmits its PRS and requests UE2 to report the ToA of the PRS received on the earliest arriving path (e.g., the earliest received PRS measurement). UE2 also sends the time-of-transmission $t_{tx}$ of the PRS transmitted by UE2 to UE1. The parameters reported by UE2 are used by UE1 to calculate the range/position of UE2 based on the direct path ToA. In an aspect, the direct path ToA corresponds to the earliest arriving path and may be determined from the earliest PRS signal received by UE2 during such time instances. FIG. 12A shows the transmission of the PRS during one of the time instants $\{t_1, t_3, t_4, t_6 \ldots\}$. The PRS received by UE2 on the earliest path occurs at $ToA_{d4}$, which may be reported along with $t_{tx}$ to UE1 to calculate the range/position of UE2.

In accordance with certain aspects, during time instances $\{t_2, t_5 \ldots\}$ when at least one RIS is enabled, UE1 transmits its PRS and requests UE2 to report the ToA of the first-best PRS measurement and the second-best PRS measurement detected by UE2. UE2 also reports the $t_{tx}$ of the corresponding PRS. The parameters reported by UE2 are used by UE1 to calculate the range/position of UE2 on both the direct path from UE1 and the reflected path from the MS.

FIG. 12B shows the transmission of the PRS during one of the time instances $\{t_2, t_5 \ldots\}$ in which RIS1 is enabled. The PRS measurement received by UE2 on the earliest path occurs at $ToA_{d5}$ and corresponds to a direct path measurement of the PRS. The second-best PRS measurement received by UE2 occurs at $ToA_{ris1(2)}$ and corresponds to a measurement of the path that includes the reflected path from RIS1. UE2 reports $ToA_{d5}$, $ToA_{ris1(2)}$, and the $t_{tx}$ of the corresponding PRS. The parameters reported by UE2 are used by UE1 to calculate the range/position of UE2 on both the direct path from UE1 and the reflected path from the RIS1.

FIG. 12C shows the transmission of the PRS during one of the time instances $\{t_2, t_5 \ldots\}$ in which RIS2 is enabled. The PRS measurement received by UE2 on the earliest path occurs at $ToA_{d6}$ and corresponds to a direct path measurement. The second-best PRS measurement received by UE2 occurs at $ToA_{ris2(2)}$ and corresponds to a measurement of the path including the reflected path from RIS2. UE2 reports $ToA_{d6}$, $ToA_{ris2(1)}$, and the $t_{tx}$ of the corresponding PRS. The parameters reported by UE2 are used by UE1 to calculate the range/position of UE2 on both the direct path from UE1 and the reflected path from RIS2.

In accordance with certain aspects of the disclosure, UE1 requests UE2 to report difference timing (ToAs with respect to the time-of-transmission, $t_{tx}$, of the corresponding PRS) of the first-best path (i.e., direct path) and second-best path (i.e., reflected path) PRS measurement. As applied to the examples shown in FIGS. 12A and 12B, UE2 reports ($t_{tx} - ToA_{d4}$) as determined during an instance of $\{t_1, t_3, t_4, t_6 \ldots\}$ in which RIS1 is disabled, and ($t_{tx} - ToA_{d5}$) and ($t_{tx} - ToA_{ris1(2)}$) as determined during an instance of time $\{t_2, t_5 \ldots\}$ when RIS1 is enabled. In accordance with certain aspects of the disclosure, the reports from participating UEs could be per channel coherence interval [h1, h2], [h2+1, h3]

(i.e., when averaging of measurements to mitigate drift can be performed when RIS are disabled).

Figure 13:
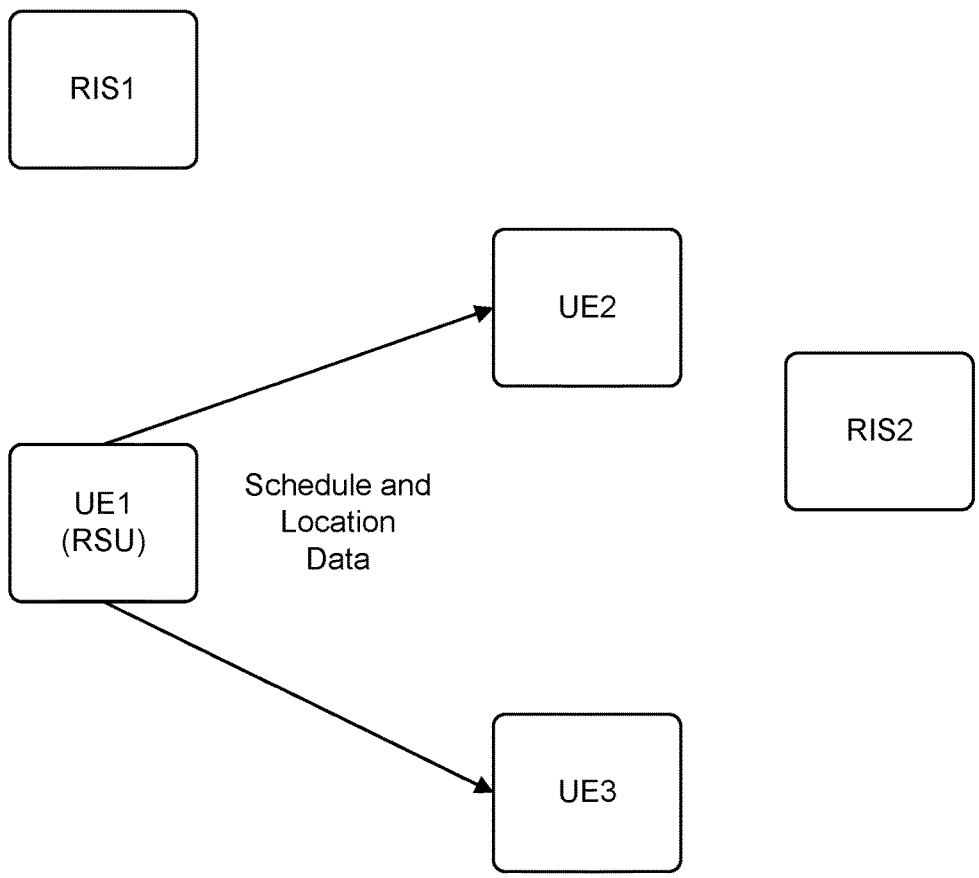
FIG. 13 shows an example of positioning in which an initiator UE sends MS and positioning reference signal (PRS) resource transmission schedules to participating UEs in accordance with certain aspects of the disclosure.

In accordance with certain aspects of the disclosure, an initiator UE may send MS schedules to participating UEs for use by the participating UEs in determining their own positions. FIG. 13 shows an example of positioning in which an initiator UE sends MS schedules to participating UEs in accordance with certain aspects of the disclosure. Additionally, the initiator UE may send PRS transmission schedules to one or more of the participating UEs indicating when selected PRS are on for measurement. In FIG. 13, the positioning environment includes multiple UEs (labeled "UE1," "UE2," and "UE3") and multiple MS (labeled "RIS1" and "RIS2"). In an aspect, UE1 may be an RSU. A participating UE may use the MS schedules in calculating the position of the participating UE.

In an aspect, UE1 determines a schedule for RIS1 in which RIS1 is enabled at scheduled times $\{t_1^1, t_2^1, t_3^1, \ldots\}$ and disabled at scheduled times $\{f_1^1, f_2^1, f_3^1, \ldots\}$. Additionally, UE1 may determine a schedule for RIS2 in which RIS2 is enabled at scheduled times $\{t_1^1, t_2^2, t_3^2, \ldots\}$ and disabled at scheduled times $\{f_1^2, f_2^2, f_3^2, \ldots\}$. In an aspect, UE1 may also transmit the fixed location data for RIS1 ($RIS1_{loc}=A$), RIS2 ($RIS2_{loc}=B$), and UE1 ($UE1_{loc}=C$). In an aspect, UE1 may transmit a PRS measurement schedule to each participating UE indicating times $\{t_1^{PRS}, t_2^{PRS}, t_3^{PRS}, \ldots\}$ when the PRS is available for measurement by the participating UE. The scheduling information is sent by the initiator UE to the participating UEs in the positioning environment.

Figure 14A:
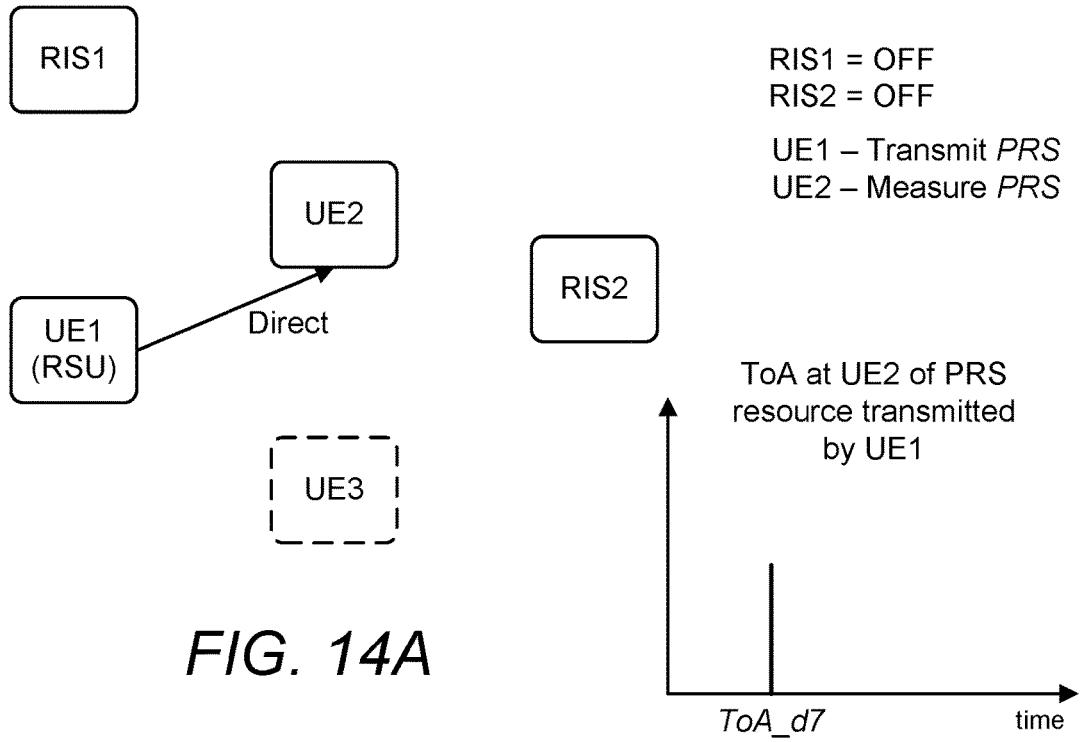
FIGS. 14A, 14B, and 14C show example positioning operations in accordance with certain aspects of the disclosure.
Figure 14B:
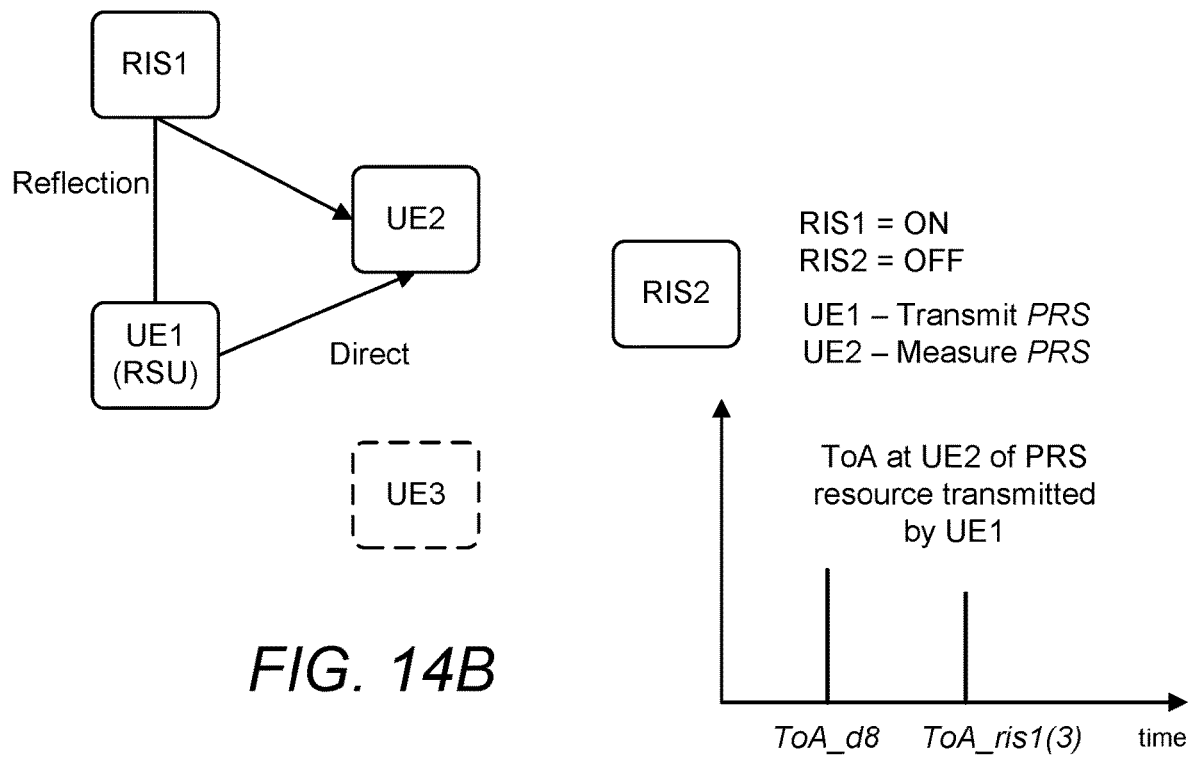
Figure 14C:
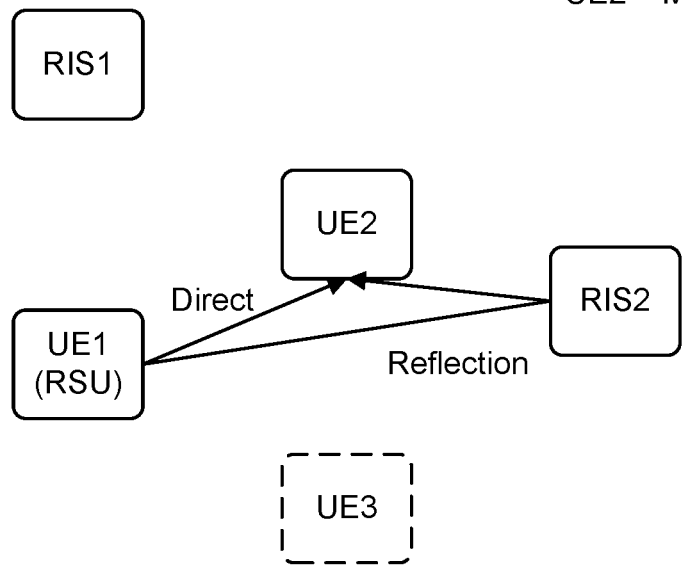
Figure 14C:
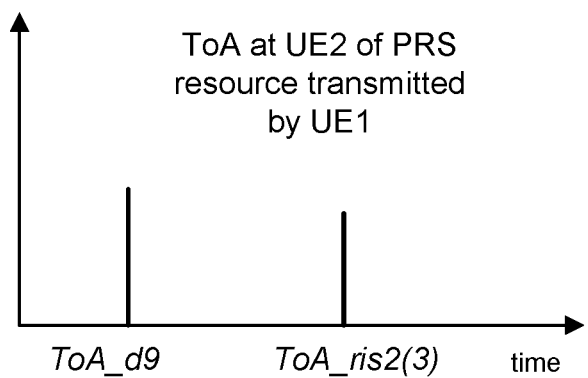

FIGS. 14A, 14B, and 14C (collectively FIG. 14) show example positioning operations in which the RIS schedules and locations sent by the initiator UE in FIG. 13 are used by the participating UEs in determining their own positions. In the examples shown in FIG. 14, the initiator UE (labeled "UE1") controls the enabling and disabling of the RIS, labeled "RIS1" and "RIS2." The participating UEs (labeled "UE2" and "UE3") receive scheduling information from initiator UE, UE1, as shown in FIG. 13. The participating UEs conduct positioning measurements based on the scheduling information to measure at least one PRS of UE1 when RIS in the positioning environment are disabled, and to measure at least one PRS of UE1 when at least one RIS in the positioning environment is enabled. Each participating UE may calculate its position using the PRS measurements made in accordance with the RIS and PRS transmission schedules.

The participating UEs may make PRS measurements at times when the RIS are enabled and at times when the RIS are disabled. During times when the RIS are disabled, the participating UEs calculate the ToA based on the best/first received path. As shown in FIG. 14A, the PRS measurement of the first-best received path occurs at time $ToA_{d7}$. During the times when at least one RIS is enabled, participating UEs calculate ToAs based on the first-best received path and the second-best received path, which respectively correspond to the direct path from the initiator UE and reflected path from the enabled MS. As shown in FIG. 14B, the PRS measurement of the first-best received path (i.e., direct path) occurs at time $ToA_{d8}$ and the PRS measurement of the second-best received path (i.e., the path including the reflected path from RIS1) occurs at time $ToA_{ris1(3)}$. In FIG. 14C, UE1 has disabled RIS1 and enabled RIS2 while transmitting its PRS. The PRS measurement of the first-best received path (i.e., direct path) occurs at $ToA_{d9}$ and the PRS measurement of the second-best received path (e.g., the path including the reflected path from RIS2) occurs at $ToA_{ris2(3)}$. Each participating UE may determine its position based on the range calculated from the initiator UE (e.g., range of UE2 to UE1), the ranges calculated from one or more RIS (e.g., range of the participating UE to RIS1 and/or RIS2), the known position of the initiator UE (e.g., known of UE1), and the known positions of the one or more MS (e.g., known positions of RIS1 and/or RIS2). The known positions may be absolute positions on earth and may be expressed as latitude and longitudinal values.

FIG. 14 shows an example of single-sided time-of-flight positioning procedures. However, the example of FIG. 14 may be extended to cases in which an RTT method is used for the positioning of the participating UEs. For a case when RTT is used, PRS measurements are also conducted on PRS transmitted from the participating UE (e.g., UE2) based on the RIS schedule. In one example, UE2 transmits its PRS when RIS1 and RIS2 are disabled. UE1 then reports the ToA of the PRS received on direct path from U2 along with the time of transmission $t_{tx}$ of the PRS by UE2. UE1 also transmits its PRS when at least one of the MS (e.g., RIS1) is enabled. UE2 then reports, to UE1, the ToAs of the PRS received on both the direct and reflected paths together with the time of transmission $t_{tx}$ of the PRS. Alternately, UE1 may report the ToAs to UE2 differentially with respect to the $t_{tx}$ of the corresponding PRS.

In accordance with certain aspects of the disclosure, the initiator UE calculates its position without control of the MS. In such instances, a UE, base station, or RSU, other than the initiator UE may be charged with controlling the MS while the initiator UE conducts its positioning measurements.

Figure 15:
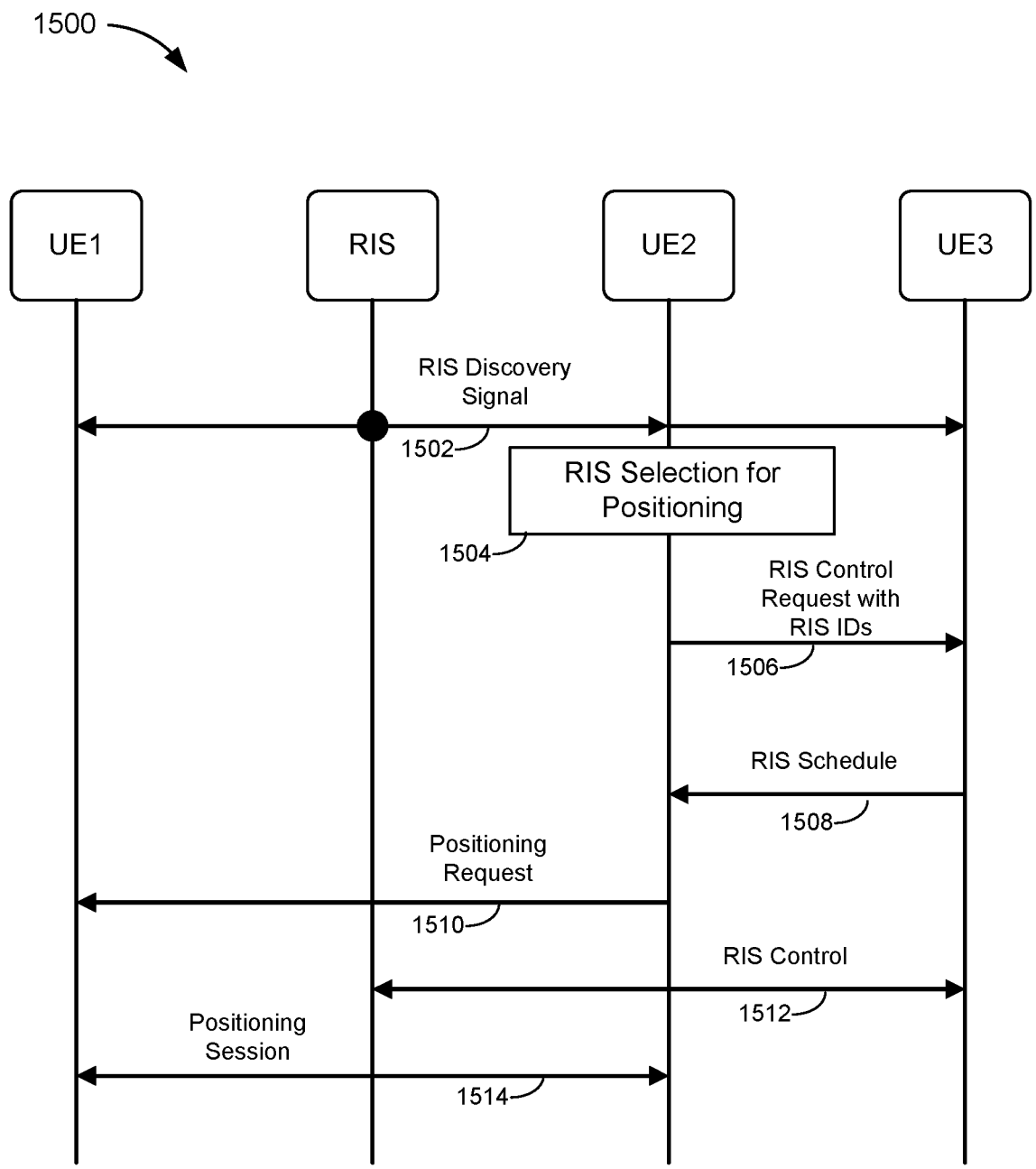
FIG. 15 is an example flow call that may be used in positioning operations in which the initiator UE does not control the MS in the positioning environment in accordance with certain aspects of the disclosure.

FIG. 15 is an example flow call 1500 that may be used in positioning operations in which the initiator UE does not control the MS in the positioning environment. In FIG. 15, an initiator UE (e.g., labeled "UE2") cannot control the MS schedule, and, as such, requests another UE (e.g., UE3 or another participating UE) to do so. To this end, the initiator UE2 that is to determine its own position discovers the presence of one or more RIS (e.g., RIS1) in its vicinity at 1502. In certain aspects, an MS can transmit a discovery signal, including an indication of its availability for positioning services, along with its absolute position and MS ID. At operation 1504, UE2 chooses a preferred set of MS that includes the MS that are most suitable for its own positioning. In accordance with certain aspects, the preferred MS set (e.g., denoted {RIS1, RIS2, ... RISN}) is chosen based on an approximate range between the initiator UE2 and the discovered MS. In certain aspects, the preferred MS set may be chosen based on the geographical zone in which the MS are located. For example, UE2 may prioritize selection of RIS that are located in approximately the same zone as UE2. In an aspect, the preferred MS set could be chosen based on the RSRP of the discovery signal received by UE2.

Once UE2 has selected the set of MS that are to be used in its positioning operations, UE2 requests control of the RIS by another UE having RIS control capability at 1506. As part of the request, UE2 provides the MS IDs of the MS in the set to the other UE. In the example shown in FIG. 15, UE2 provides a control request to UE3 along with the RIS IDs to control provided UE3 has the capability of controlling the RIS associated with the RIS IDs in the control request.

In response to the control request from UE2, UE3 provides an RIS schedule to UE2 at 1508. The RIS schedule indicates times at which the RIS of the preferred RIS set is in an enabled state and times at which the RIS is in a disabled state, and sends the schedule to UE2. UE2 submits a request for transmission of a PRS to UE1 to initiate a ranging session at 1510. UE2 calculates the ToA of the first-best path, or first and second-best path depending on whether MS are disabled/enabled for that instant in the MS schedule as controlled by UE3 at 1512. UE2 calculates its position based on the range estimates of the direct path to UE1, the path including the reflection path from the MS, and the know positions of the MS and UE1 at 1514.

Figure 16:
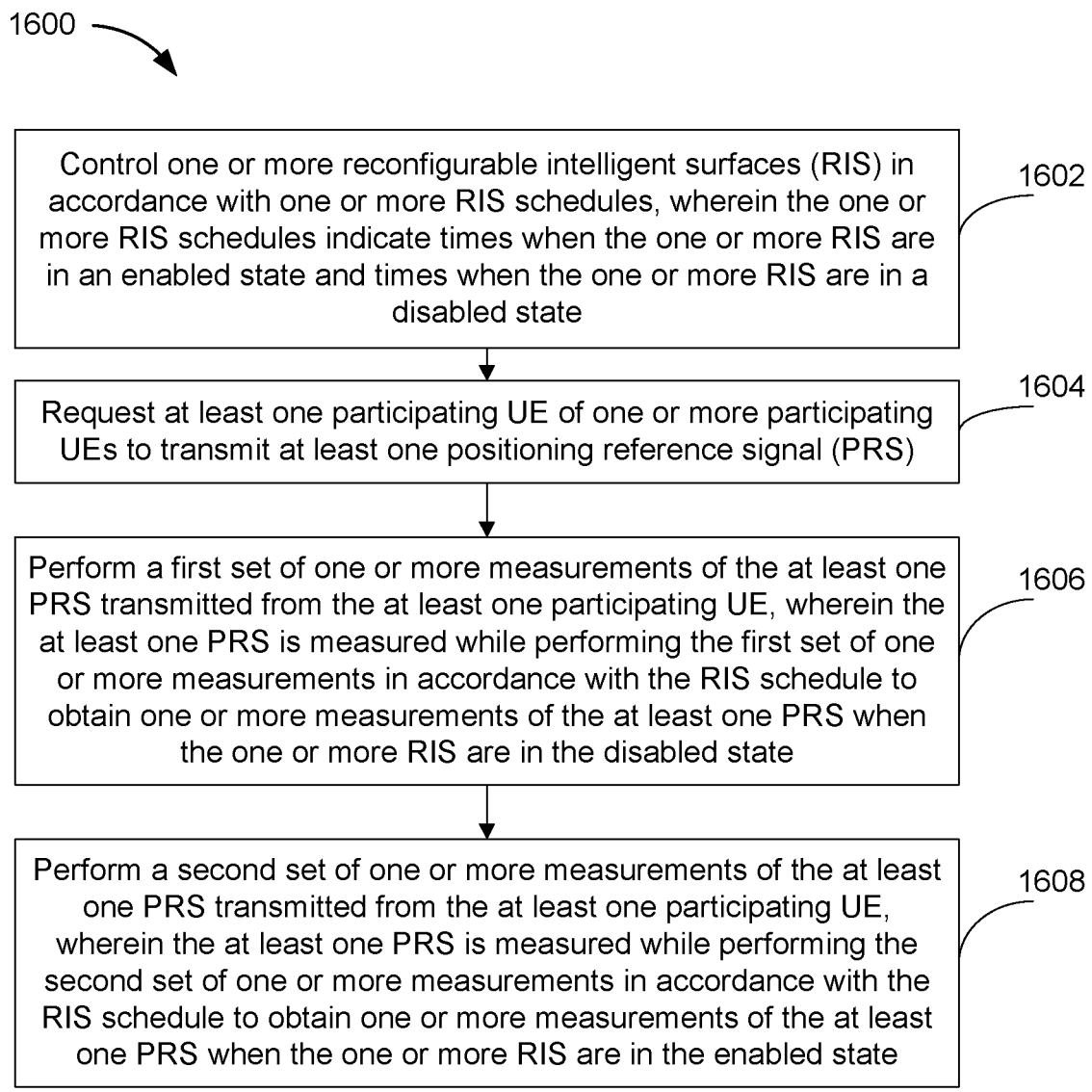
FIG. 16 illustrates an example method of wireless communication performed by a UE in accordance with certain aspects of the disclosure.

FIG. 16 illustrates an example method 1600 of wireless communication performed by a user equipment (UE). At operation 1602, the UE controls one or more reconfigurable intelligent surfaces (MS) in accordance with one or more RIS schedules, wherein the one or more RIS schedules indicate times when the one or more RIS are in an enabled state and times when the one or more RIS are in a disabled state. In an aspect, operation 1602 may be performed by the one or more WWAN transceivers 310, the one or more processors 332, memory 340, and/or positioning component 342, any or all of which may be considered means for performing this operation.

At operation 1604, the UE requests at least one participating UE of one or more participating UEs to transmit at least one positioning reference signal (PRS). In an aspect, operation 1604 may be performed by the one or more WWAN transceivers 310, the one or more processors 332, memory 340, and/or positioning component 342, any or all of which may be considered means for performing this operation.

At operation where 1606, the UE performs a first set of one or more measurements of the at least one PRS transmitted from the at least one participating UE, wherein the at least one PRS is measured while performing the first set of one or more measurements in accordance with the MS schedule to obtain one or more measurements of the at least one PRS when the one or more RIS are in the disabled state. In an aspect, operation 1606 may be performed by the one or more WWAN transceivers 310, the one or more processors 332, memory 340, and/or positioning component 342, any or all of which may be considered means for performing this operation.

At operation where 1608, the UE performs a second set of one or more measurements of the at least one PRS transmitted from the at least one participating UE, wherein the at least one PRS is measured while performing the second set of one or more measurements in accordance with the RIS schedule to obtain one or more measurements of the at least one PRS when the one or more RIS are in the enabled state. In an aspect, operation 1608 may be performed by the one or more WWAN transceivers 310, the one or more processors 332, memory 340, and/or positioning component 342, any or all of which may be considered means for performing this operation.

Figure 17:
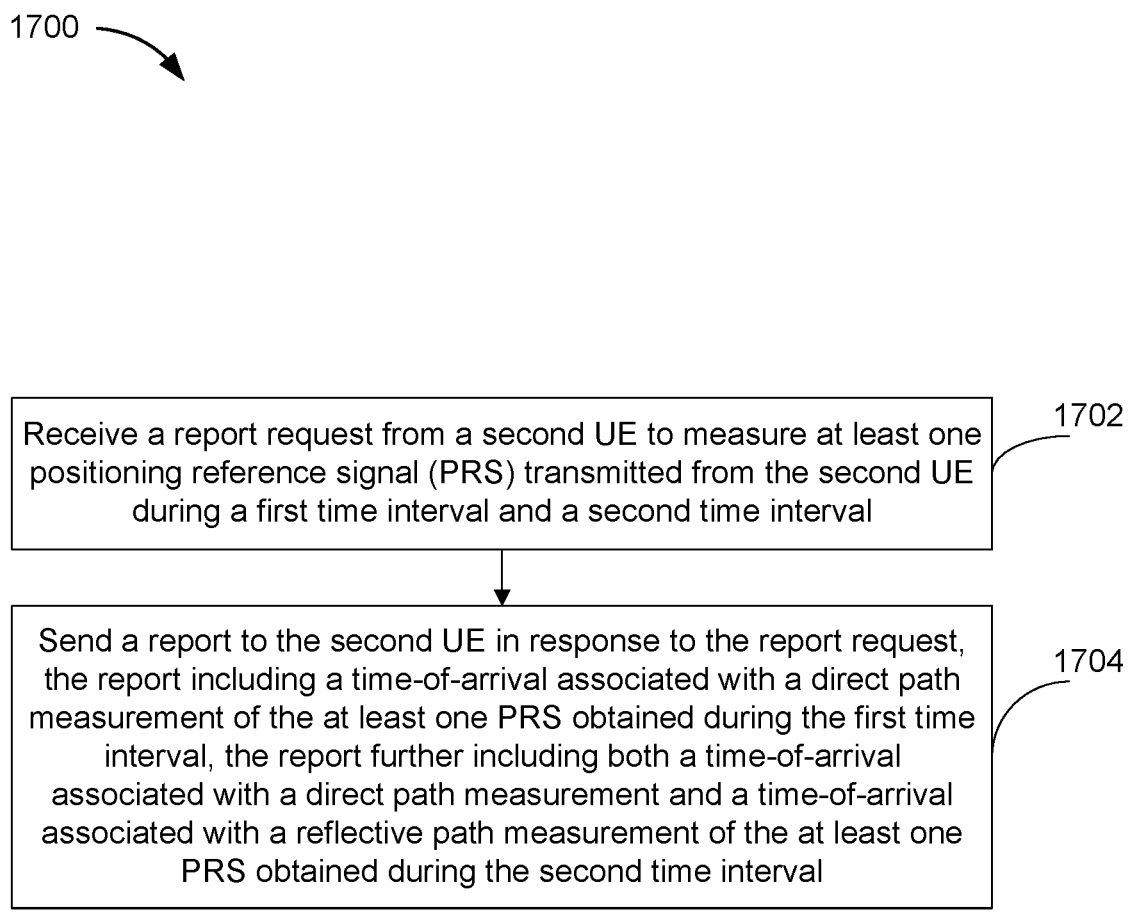
FIG. 17 illustrates an example method of wireless communication performed by a first UE in accordance with certain aspects of the disclosure.

FIG. 17 illustrates an example method 1700 of wireless communication performed by a first user equipment (UE). At operation 1702, the first UE receives Receive a report request from a second UE to measure at least one positioning reference signal (PRS) transmitted from the second UE during a first time interval and a second time interval. In an aspect, operation 1702 may be performed by the one or more WWAN transceivers 310, the one or more processors 332, memory 340, and/or positioning component 342, any or all of which may be considered means for performing this operation.

At operation 1704, the first UE sends a report to the second UE in response to the report request, the report including a time-of-arrival associated with a direct path measurement of the at least one PRS obtained during the first time interval, the report further including both a time-of-arrival associated with a direct path measurement and a time-of-arrival associated with a reflective path measurement of the at least one PRS obtained during the second time interval. In an aspect, operation 1704 may be performed by the one or more WWAN transceivers 310, the one or more processors 332, memory 340, and/or positioning component 342, any or all of which may be considered means for performing this operation.

Figure 18:
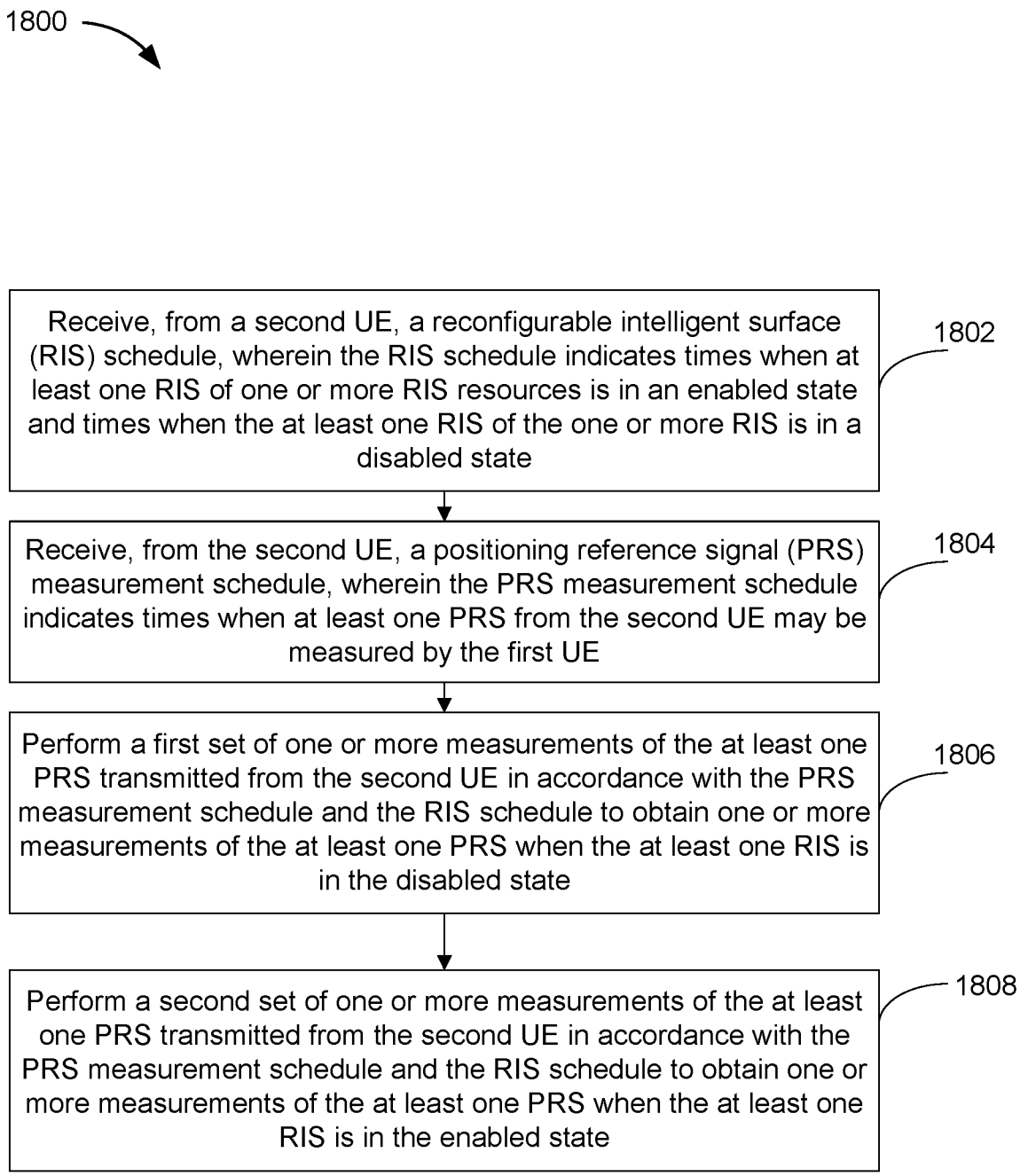
FIG. 18 illustrates an example method of wireless communication performed by a first UE in accordance with certain aspects of the disclosure.

FIG. 18 illustrates an example method 1800 of wireless communication performed by a first user equipment (UE). At operation 1802, the first UE receives, from a second UE, a reconfigurable intelligent surface (RIS) schedule, wherein the RIS schedule indicates times when at least one MS of one or more MS resources is in an enabled state and times when the at least one MS of the one or more MS is in a disabled state. In an aspect, operation 1802 may be performed by the one or more WWAN transceivers 310, the one or more processors 332, memory 340, and/or positioning component 342, any or all of which may be considered means for performing this operation.

At operation 1804, the first UE receives, from the second UE, a positioning reference signal (PRS) measurement schedule, wherein the PRS measurement schedule indicates times when at least one PRS from the second UE may be measured by the first UE. In an aspect, operation 1804 may be performed by the one or more WWAN transceivers 310, the one or more processors 332, memory 340, and/or positioning component 342, any or all of which may be considered means for performing this operation.

At operation 1806, the first UE performs a first set of one or more measurements of the at least one PRS transmitted from the second UE in accordance with the PRS measurement schedule and the RIS schedule to obtain one or more measurements of the at least one PRS when the at least one RIS is in the disabled state. In an aspect, operation 1806 may be performed by the one or more WWAN transceivers 310, the one or more processors 332, memory 340, and/or positioning component 342, any or all of which may be considered means for performing this operation.

At operation 1808, the first UE performs a second set of one or more measurements of the at least one PRS transmitted from the second UE in accordance with the PRS measurement schedule and the RIS schedule to obtain one or more measurements of the at least one PRS when the at least one RIS is in the enabled state. In an aspect, operation 1808 may be performed by the one or more WWAN transceivers 310, the one or more processors 332, memory 340, and/or positioning component 342, any or all of which may be considered means for performing this operation.

Figure 19:
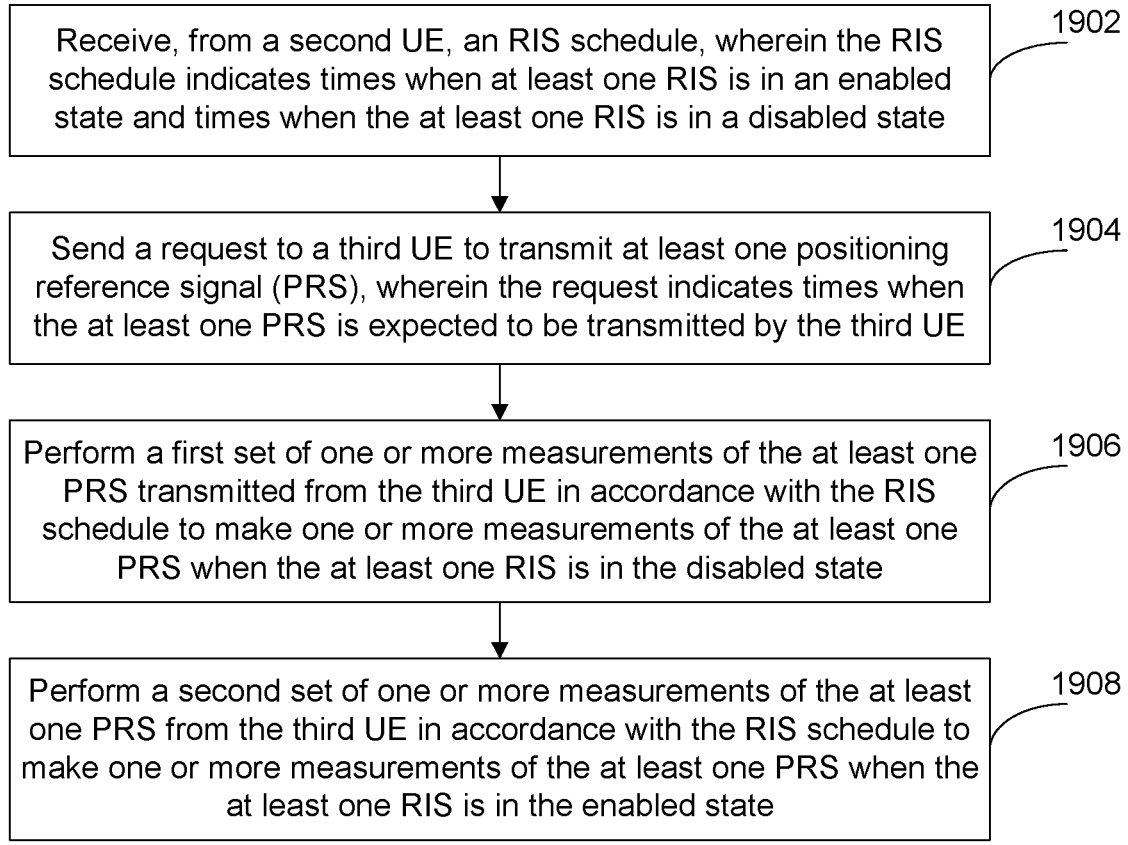
FIG. 19 illustrates an example method of wireless communication performed by a first UE in accordance with certain aspects of the disclosure.

FIG. 19 illustrates an example method 1900 of wireless communication performed by a first user equipment (UE). At operation 1902, the first UE receives, from a second UE, an RIS schedule, wherein the RIS schedule indicates times when at least one RIS is in an enabled state and times when the at least one RIS is in a disabled state. In an aspect, operation 1902 may be performed by the one or more WWAN transceivers 310, the one or more processors 332, memory 340, and/or positioning component 342, any or all of which may be considered means for performing this operation.

At operation 1904, the first UE sends a request to a third UE to transmit at least one positioning reference signal (PRS), wherein the request indicates times when the at least one PRS is expected to be transmitted by the third UE. In an aspect, operation 1904 may be performed by the one or more WWAN transceivers 310, the one or more processors 332, memory 340, and/or positioning component 342, any or all of which may be considered means for performing this operation.

At operation 1906, the first UE performs a first set of one or more measurements of the at least one PRS transmitted from the third UE in accordance with the RIS schedule to make one or more measurements of the at least one PRS when the at least one RIS is in the disabled state. In an aspect, operation 1906 may be performed by the one or more WWAN transceivers 310, the one or more processors 332, memory 340, and/or positioning component 342, any or all of which may be considered means for performing this operation.

At operation 1908, the first UE performs a second set of one or more measurements of the at least one PRS from the third UE in accordance with the RIS schedule to make one or more measurements of the at least one PRS when the at least one RIS is in the enabled state. In an aspect, operation 1906 may be performed by the one or more WWAN transceivers 310, the one or more processors 332, memory 340, and/or positioning component 342, any or all of which may be considered means for performing this operation.

As will be appreciated, technical advantages of methods 1600 to 1900 include the benefits of leveraging the availability of RIS in a positioning environment to enhance sidelink positioning of UEs within the positioning environment. In accordance with certain aspects, UE positioning measurements are enhanced with PRS and RIS at known locations. The ability to effectively use the RIS in positioning is based on setting a RIS schedule in which RIS are enabled at certain time instances and disabled at other time instances during PRS transmissions.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: controlling one or more reconfigurable intelligent surfaces (RIS) in accordance with one or more RIS schedules, wherein the one or more RIS schedules indicate times when the one or more RIS are in an enabled state and times when the one or more RIS are in a disabled state; requesting at least one participating UE of one or more participating UEs to transmit at least one positioning reference signal (PRS); performing a first set of one or more measurements of the at least one PRS transmitted from the at least one participating UE, wherein the at least one PRS is measured while performing the first set of one or more measurements in accordance with the RIS schedule to obtain one or more measurements of the at least one PRS when the one or more RIS are in the disabled state; and performing a second set of one or more measurements of the at least one PRS transmitted from the at least one participating UE, wherein the at least one PRS is measured while performing the second set of one or more measurements in accordance with the RIS schedule to obtain one or more measurements of the at least one PRS when the one or more RIS are in the enabled state.

Clause 2. The method of clause 1, wherein: the UE is a roadside unit (RSU).

Clause 3. The method of any of clauses 1 to 2, wherein: based on the RIS schedule, at least one measurement from performing the second set of one or more measurements is obtained when the at least one PRS is received from the at least one participating UE over a coherent channel.

Clause 4. The method of any of clauses 1 to 3, wherein performing the first set of one or more measurements comprises: measuring a time-of-arrival (ToA) of the at least one PRS of the at least one participating UE.

Clause 5. The method of any of clauses 1 to 4, further comprising: transmitting a PRS transmission schedule to the at least one participating UE, wherein the PRS transmission schedule requests the at least one participating UE to transmit the at least one PRS at scheduled times indicated by the PRS transmission schedule, and wherein the PRS transmission schedule is determined based on the RIS schedule.

Clause 6. The method of any of clauses 1 to 5, further comprising: determining a range between the UE and the at least one participating UE using the one or more measurements obtained when performing the first set of one or more measurements.

Clause 7. The method of clause 6, wherein: determining the range between the UE and the at least one participating UE includes using an averaging technique of multiple measurements of the at least one PRS obtained when performing the first set of one or more measurements.

Clause 8. The method of any of clauses 6 to 7, further comprising: determining a range between the at least one participating UE and at least one RIS of the one or more RIS using the one or more measurements of the at least one PRS obtained when performing the second set of one or more measurements.

Clause 9. The method of any of clauses 1 to 8, further comprising: determining a range between the UE and the at least one participating UE using the one or more measurements of the at least one PRS obtained when performing the first set of one or more measurements; determining a range between the at least one participating UE and at least one RIS of the one or more RIS using the one or more measurements of the at least one PRS obtained when performing the second set of one or more measurements; and determining a position of the at least one participating UE using the range between the UE and the at least one participating UE, the range between the at least one participating UE and the at least one RIS, a known position of the UE, and a known position of the at least one RIS.

Clause 10. A method of wireless communication performed by a first user equipment (UE), comprising: receiving a report request from a second UE to measure at least one positioning reference signal (PRS) transmitted from the second UE during a first time interval and a second time interval; and sending a report to the second UE in response to the report request, the report including a time-of-arrival associated with a direct path measurement of the at least one PRS obtained during the first time interval, the report further including both a time-of-arrival associated with a direct path measurement and a time-of-arrival associated with a reflective path measurement of the at least one PRS obtained during the second time interval.

Clause 11. The method of clause 10, wherein: the time-of-arrival associated with the direct path measurement of the at least one PRS is determined from an earliest received PRS measurement obtained by the first UE during the first time interval.

Clause 12. The method of any of clauses 10 to 11, wherein: the time-of-arrival associated with the direct path measurement of the at least one PRS is determined from an earliest received PRS measurement obtained by the first UE during the second time interval; and the time-of-arrival associated with the reflective path measurement of the at least one PRS is determined from a second, earliest received PRS measurement obtained by the first UE during the second time interval.

Clause 13. The method of any of clauses 10 to 12, wherein: each time-of-arrival is reported as a time difference with respect to a transmission time of the at least one PRS.

Clause 14. A method of wireless communication performed by a first user equipment (UE), comprising: receiving, from a second UE, a reconfigurable intelligent surface (RIS) schedule, wherein the RIS schedule indicates times when at least one RIS of one or more RIS resources is in an enabled state and times when the at least one RIS of the one or more RIS is in a disabled state; receiving, from the second UE, a positioning reference signal (PRS) measurement schedule, wherein the PRS measurement schedule indicates times when at least one PRS from the second UE may be measured by the first UE; performing a first set of one or more measurements of the at least one PRS transmitted from the second UE in accordance with the PRS measurement schedule and the RIS schedule to obtain one or more measurements of the at least one PRS when the at least one RIS is in the disabled state; and performing a second set of one or more measurements of the at least one PRS transmitted from the second UE in accordance with the PRS measurement schedule and the RIS schedule to obtain one or more measurements of the at least one PRS when the at least one RIS is in the enabled state.

Clause 15. The method of clause 14, wherein: the second UE is a roadside unit (RSU).

Clause 16. The method of any of clauses 14 to 15, further comprising: coordinating the PRS measurement schedule and RIS schedule such that at least one measurement obtained when performing the first set of one or more measurements is obtained when the at least one PRS is received from the second UE over a coherent channel.

Clause 17. The method of any of clauses 14 to 16, wherein performing the first set of one or more measurements, comprises: determining a time-of-arrival of the at least one PRS corresponding to a direct path measurement of the at least one PRS.

Clause 18. The method of clause 17, wherein performing the second set of one or more measurements, comprises: determining a time-of-arrival of the at least one PRS corresponding to a direct path measurement of the at least one PRS; and determining a time-of-arrival of the at least one PRS corresponding to a reflective path measurement of the at least one PRS as reflected by the at least one RIS.

Clause 19. The method of clause 18, further comprising: transmitting, by the first UE, at least one PRS when the at least one RIS is in the enabled state; transmitting, by the first UE, at least one PRS when the at least one RIS is in the disabled state; receiving a report from the second UE, wherein the report indicates a first time-of-arrival measurement of the at least one PRS transmitted by the first UE made by the second UE when the at least one RIS is in the disabled state, wherein the first time-of-arrival measurement corresponds to a direct path measurement of the at least one PRS; a second time-of-arrival measurement of the at least one PRS transmitted by the first UE made by the second UE when the at least one RIS is in the enabled state, wherein the second time-of-arrival measurement corresponds to a direct path measurement of the at least one PRS; and a third time-of-arrival measurement of the at least one PRS transmitted by the first UE made by the second UE when the at least one RIS is in the enabled state, wherein the third time-of-arrival measurement corresponds to a reflective path measurement of the at least one PRS of the first UE from the at least one RIS.

Clause 20. The method of clause 19, further comprising: sending, to the second UE, a first time-of-transmission of the at least one PRS transmitted by the first UE when the at least one RIS is in the enabled state; and sending, to the second UE, a second time-of-transmission of the at least one PRS transmitted by the first UE when the at least one RIS is in the disabled state.

Clause 21. The method of clause 20, wherein: the report indicates the first time-of-arrival as a difference measurement with respect to the first time-of-transmission; the report indicates the second time-of-arrival as a difference measurement with respect to the second time-of-transmission; and the report indicates the third time-of-arrival as a difference measurement with respect to the second time-of-transmission.

Clause 22. The method of any of clauses 14 to 21, further comprising: determining a range between the first UE and the second UE using the one or more measurements obtained when performing the first set of one or more measurements.

Clause 23. The method of clause 22, wherein: determining the range between the first UE and the second UE includes using an averaging technique of multiple measurements obtained when performing the first set of one or more measurements.

Clause 24. The method of any of clauses 14 to 23, further comprising: determining a range between the first UE and the at least one RIS of the one or more RIS using the one or more measurements obtained when performing the second set of one or more measurements.

Clause 25. The method of any of clauses 14 to 24, further comprising: receiving, from the second UE, a known position of the second UE; and receiving, from the second UE, a position of the at least one RIS of the one or more RIS.

Clause 26. The method of clause 25, further comprising: determining a range between the first UE and the second UE using the one or more measurements obtained when performing the first set of one or more measurements; determining a range between the first UE and the at least one RIS using the one or more measurements obtained when performing the second set of one or more measurements; and determining a position of the first UE using the range between the first UE and the second UE, the range between the first UE and the at least one RIS, the known position of the second UE, and the known position of the at least one RIS.

Clause 27. A method of wireless communication performed by a first user equipment (UE), comprising: receiving, from a second UE, an RIS schedule, wherein the RIS schedule indicates times when at least one RIS is in an enabled state and times when the at least one RIS is in a disabled state; sending a request to a third UE to transmit at least one positioning reference signal (PRS), wherein the request indicates times when the at least one PRS is expected to be transmitted by the third UE; and performing a first set of one or more measurements of the at least one PRS transmitted from the third UE in accordance with the RIS schedule to make one or more measurements of the at least one PRS when the at least one RIS is in the disabled state; and performing a second set of one or more measurements of the at least one PRS from the third UE in accordance with the RIS schedule to make one or more measurements of the at least one PRS when the at least one RIS is in the enabled state.

Clause 28. The method of clause 27, further comprising: sending, to the second UE, a request to control at least one reconfigurable intelligent surface (RIS) of one or more RIS.

Clause 29. The method of any of clauses 27 to 28, further comprising: coordinating the indicated times when the at least one PRS is expected to be transmitted by the third UE and the RIS schedule such that at least one measurement of obtained when performing the first set of one or more measurements is obtained when the at least one PRS is received from the third UE over a coherent channel.

Clause 30. The method of any of clauses 27 to 29, wherein performing the first set of one or more measurements, comprises: measuring a time-of-arrival (ToA) of the at least one PRS from the third UE.

Clause 31. A user equipment (UE), comprising: a memory; at least one transceiver; and at least one processor communicatively coupled to the memory and the at least one transceiver, the at least one processor configured to: control one or more reconfigurable intelligent surfaces (RIS) in accordance with one or more RIS schedules, wherein the one or more RIS schedules indicate times when the one or more RIS are in an enabled state and times when the one or more RIS are in a disabled state; request at least one participating UE of one or more participating UEs to transmit at least one positioning reference signal (PRS); perform a first set of one or more measurements of the at least one PRS transmitted from the at least one participating UE, wherein the at least one PRS is measured while performing the first set of one or more measurements in accordance with the RIS schedule to obtain one or more measurements of the at least one PRS when the one or more RIS are in the disabled state; and perform a second set of one or more measurements of the at least one PRS transmitted from the at least one participating UE, wherein the at least one PRS is measured while performing the second set of one or more measurements in accordance with the RIS schedule to obtain one or more measurements of the at least one PRS when the one or more RIS are in the enabled state.

Clause 32. The UE of clause 31, wherein: the UE is a roadside unit (RSU).

Clause 33. The UE of any of clauses 31 to 32, wherein: based on the RIS schedule, at least one measurement from performing the second set of one or more measurements is obtained when the at least one PRS is received from the at least one participating UE over a coherent channel.

Clause 34. The UE of any of clauses 31 to 33, wherein, to perform the first set of one or more measurements, the at least one processor is configured to: measure a time-of-arrival (ToA) of the at least one PRS of the at least one participating UE.

Clause 35. The UE of any of clauses 31 to 34, wherein the at least one processor is further configured to: transmit, via the at least one transceiver, a PRS transmission schedule to the at least one participating UE, wherein the PRS transmission schedule requests the at least one participating UE to transmit the at least one PRS at scheduled times indicated by the PRS transmission schedule, and wherein the PRS transmission schedule is determined based on the RIS schedule.

Clause 36. The UE of any of clauses 31 to 35, wherein the at least one processor is further configured to: determine a range between the UE and the at least one participating UE using the one or more measurements obtained when performing the first set of one or more measurements.

Clause 37. The UE of clause 36, wherein: determine the range between the UE and the at least one participating UE includes using an averaging technique of multiple measurements of the at least one PRS obtained when performing the first set of one or more measurements.

Clause 38. The UE of any of clauses 36 to 37, wherein the at least one processor is further configured to: determine a range between the at least one participating UE and at least one RIS of the one or more RIS using the one or more measurements of the at least one PRS obtained when performing the second set of one or more measurements.

Clause 39. The UE of any of clauses 31 to 38, wherein the at least one processor is further configured to: determine a range between the UE and the at least one participating UE using the one or more measurements of the at least one PRS obtained when performing the first set of one or more measurements; determine a range between the at least one participating UE and at least one RIS of the one or more RIS using the one or more measurements of the at least one PRS obtained when performing the second set of one or more measurements; and determine a position of the at least one participating UE using the range between the UE and the at least one participating UE, the range between the at least one participating UE and the at least one RIS, a known position of the UE, and a known position of the at least one RIS.

Clause 40. A first user equipment (UE), comprising: a memory; at least one transceiver; and at least one processor communicatively coupled to the memory and the at least one transceiver, the at least one processor configured to: receive, via the at least one transceiver, a report request from a second UE to measure at least one positioning reference signal (PRS) transmitted from the second UE during a first time interval and a second time interval; and send, via the at least one transceiver, a report to the second UE in response to the report request, the report including a time-of-arrival associated with a direct path measurement of the at least one PRS obtained during the first time interval, the report further including both a time-of-arrival associated with a direct path measurement and a time-of-arrival associated with a reflective path measurement of the at least one PRS obtained during the second time interval.

Clause 41. The first UE of clause 40, wherein: the time-of-arrival associated with the direct path measurement of the at least one PRS is determined from an earliest received PRS measurement obtained by the first UE during the first time interval.

Clause 42. The first UE of any of clauses 40 to 41, wherein: the time-of-arrival associated with the direct path measurement of the at least one PRS is determined from an earliest received PRS measurement obtained by the first UE during the second time interval; and the time-of-arrival associated with the reflective path measurement of the at least one PRS is determined from a second, earliest received PRS measurement obtained by the first UE during the second time interval.

Clause 43. The first UE of any of clauses 40 to 42, wherein: each time-of-arrival is reported as a time difference with respect to a transmission time of the at least one PRS.

Clause 44. A first user equipment (UE), comprising: a memory; at least one transceiver; and at least one processor communicatively coupled to the memory and the at least one transceiver, the at least one processor configured to: receive, via the at least one transceiver, from a second UE, a reconfigurable intelligent surface (RIS) schedule, wherein the RIS schedule indicates times when at least one RIS of one or more RIS resources is in an enabled state and times when the at least one RIS of the one or more RIS is in a disabled state; receive, via the at least one transceiver, from the second UE, a positioning reference signal (PRS) measurement schedule, wherein the PRS measurement schedule indicates times when at least one PRS from the second UE may be measured by the first UE; perform a first set of one or more measurements of the at least one PRS transmitted from the second UE in accordance with the PRS measurement schedule and the RIS schedule to obtain one or more measurements of the at least one PRS when the at least one RIS is in the disabled state; and perform a second set of one or more measurements of the at least one PRS transmitted from the second UE in accordance with the PRS measurement schedule and the RIS schedule to obtain one or more measurements of the at least one PRS when the at least one RIS is in the enabled state.

Clause 45. The first UE of clause 44, wherein: the second UE is a roadside unit (RSU).

Clause 46. The first UE of any of clauses 44 to 45, wherein the at least one processor is further configured to: coordinate the PRS measurement schedule and RIS schedule such that at least one measurement obtained when performing the first set of one or more measurements is obtained when the at least one PRS is received from the second UE over a coherent channel.

Clause 47. The first UE of any of clauses 44 to 46, wherein, to perform the first set of one or more measurements, the at least one processor is configured to: determine a time-of-arrival of the at least one PRS corresponding to a direct path measurement of the at least one PRS.

Clause 48. The first UE of clause 47, wherein, to perform the second set of one or more measurements, the at least one processor is configured to: determine a time-of-arrival of the at least one PRS corresponding to a direct path measurement of the at least one PRS; and determine a time-of-arrival of the at least one PRS corresponding to a reflective path measurement of the at least one PRS as reflected by the at least one RIS.

Clause 49. The first UE of clause 48, wherein the at least one processor is further configured to: transmit, via the at least one transceiver, at least one PRS when the at least one RIS is in the enabled state; transmit, via the at least one transceiver, at least one PRS when the at least one RIS is in the disabled state; receive, via the at least one transceiver, a report from the second UE, wherein the report indicates a first time-of-arrival measurement of the at least one PRS transmitted by the first UE made by the second UE when the at least one RIS is in the disabled state, wherein the first time-of-arrival measurement corresponds to a direct path measurement of the at least one PRS; a second time-of-arrival measurement of the at least one PRS transmitted by the first UE made by the second UE when the at least one RIS is in the enabled state, wherein the second time-of-arrival measurement corresponds to a direct path measurement of the at least one PRS; and a third time-of-arrival measurement of the at least one PRS transmitted by the first UE made by the second UE when the at least one RIS is in the enabled state, wherein the third time-of-arrival measurement corresponds to a reflective path measurement of the at least one PRS of the first UE from the at least one RIS.

Clause 50. The first UE of clause 49, wherein the at least one processor is further configured to: send, via the at least one transceiver, to the second UE, a first time-of-transmission of the at least one PRS transmitted by the first UE when the at least one RIS is in the enabled state; and send, via the at least one transceiver, to the second UE, a second time-of-transmission of the at least one PRS transmitted by the first UE when the at least one RIS is in the disabled state.

Clause 51. The first UE of clause 50, wherein: the report indicates the first time-of-arrival as a difference measurement with respect to the first time-of-transmission; the report indicates the second time-of-arrival as a difference measurement with respect to the second time-of-transmission; and the report indicates the third time-of-arrival as a difference measurement with respect to the second time-of-transmission.

Clause 52. The first UE of any of clauses 44 to 51, wherein the at least one processor is further configured to: determine a range between the first UE and the second UE using the one or more measurements obtained when performing the first set of one or more measurements.

Clause 53. The first UE of clause 52, wherein: determine the range between the first UE and the second UE includes using an averaging technique of multiple measurements obtained when performing the first set of one or more measurements.

Clause 54. The UE of any of clauses 44 to 53, wherein the at least one processor is further configured to: determine a range between the first UE and the at least one RIS of the one or more RIS using the one or more measurements obtained when performing the second set of one or more measurements.

Clause 55. The first UE of any of clauses 44 to 54, wherein the at least one processor is further configured to: receive, via the at least one transceiver, from the second UE, a known position of the second UE; and receive, via the at least one transceiver, from the second UE, a position of the at least one RIS of the one or more RIS.

Clause 56. The first UE of clause 55, wherein the at least one processor is further configured to: determine a range between the first UE and the second UE using the one or more measurements obtained when performing the first set of one or more measurements; determine a range between the first UE and the at least one RIS using the one or more measurements obtained when performing the second set of one or more measurements; and determine a position of the first UE using the range between the first UE and the second UE, the range between the first UE and the at least one RIS, the known position of the second UE, and the known position of the at least one RIS.

Clause 57. A first user equipment (UE), comprising: a memory; at least one transceiver; and at least one processor communicatively coupled to the memory and the at least one transceiver, the at least one processor configured to: receive, via the at least one transceiver, from a second UE, an RIS schedule, wherein the RIS schedule indicates times when at least one RIS is in an enabled state and times when the at least one RIS is in a disabled state; send, via the at least one transceiver, a request to a third UE to transmit at least one positioning reference signal (PRS), wherein the request indicates times when the at least one PRS is expected to be transmitted by the third UE; and perform a first set of one or more measurements of the at least one PRS transmitted from the third UE in accordance with the RIS schedule to make one or more measurements of the at least one PRS when the at least one RIS is in the disabled state; and perform a second set of one or more measurements of the at least one PRS from the third UE in accordance with the RIS schedule to make one or more measurements of the at least one PRS when the at least one RIS is in the enabled state.

Clause 58. The first UE of clause 57, wherein the at least one processor is further configured to: send, via the at least one transceiver, to the second UE, a request to control at least one reconfigurable intelligent surface (RIS) of one or more RIS.

Clause 59. The first UE of any of clauses 57 to 58, wherein the at least one processor is further configured to: coordinate the indicated times when the at least one PRS is expected to be transmitted by the third UE and the RIS schedule such that at least one measurement of obtained when performing the first set of one or more measurements is obtained when the at least one PRS is received from the third UE over a coherent channel.

Clause 60. The first UE of any of clauses 57 to 59, wherein, to perform the first set of one or more measurements, the at least one processor is configured to: measure a time-of-arrival (ToA) of the at least one PRS from the third UE.

Clause 61. A user equipment (UE), comprising: means for controlling one or more reconfigurable intelligent surfaces (RIS) in accordance with one or more RIS schedules, wherein the one or more RIS schedules indicate times when the one or more RIS are in an enabled state and times when the one or more RIS are in a disabled state; means for requesting at least one participating UE of one or more participating UEs to transmit at least one positioning reference signal (PRS); means for performing a first set of one or more measurements of the at least one PRS transmitted from the at least one participating UE, wherein the at least one PRS is measured while performing the first set of one or more measurements in accordance with the RIS schedule to obtain one or more measurements of the at least one PRS when the one or more RIS are in the disabled state; and means for performing a second set of one or more measurements of the at least one PRS transmitted from the at least one participating UE, wherein the at least one PRS is measured while performing the second set of one or more measurements in accordance with the RIS schedule to obtain one or more measurements of the at least one PRS when the one or more RIS are in the enabled state.

Clause 62. The UE of clause 61, wherein: the UE is a roadside unit (RSU).

Clause 63. The UE of any of clauses 61 to 62, wherein: based on the RIS schedule, at least one measurement from performing the second set of one or more measurements is obtained when the at least one PRS is received from the at least one participating UE over a coherent channel.

Clause 64. The UE of any of clauses 61 to 63, wherein the means for performing the first set of one or more measurements comprises: means for measuring a time-of-arrival (ToA) of the at least one PRS of the at least one participating UE.

Clause 65. The UE of any of clauses 61 to 64, further comprising: means for transmitting a PRS transmission schedule to the at least one participating UE, wherein the PRS transmission schedule requests the at least one participating UE to transmit the at least one PRS at scheduled times indicated by the PRS transmission schedule, and wherein the PRS transmission schedule is determined based on the RIS schedule.

Clause 66. The UE of any of clauses 61 to 65, further comprising: means for determining a range between the UE and the at least one participating UE using the one or more measurements obtained when performing the first set of one or more measurements.

Clause 67. The UE of clause 66, wherein: means for determining the range between the UE and the at least one participating UE includes using an averaging technique of multiple measurements of the at least one PRS obtained when performing the first set of one or more measurements.

Clause 68. The UE of any of clauses 66 to 67, further comprising: means for determining a range between the at least one participating UE and at least one RIS of the one or more RIS using the one or more measurements of the at least one PRS obtained when performing the second set of one or more measurements.

Clause 69. The UE of any of clauses 61 to 68, further comprising: means for determining a range between the UE and the at least one participating UE using the one or more measurements of the at least one PRS obtained when performing the first set of one or more measurements; means for determining a range between the at least one participating UE and at least one RIS of the one or more RIS using the one or more measurements of the at least one PRS obtained when performing the second set of one or more measurements; and means for determining a position of the at least one participating UE using the range between the UE and the at least one participating UE, the range between the at least one participating UE and the at least one RIS, a known position of the UE, and a known position of the at least one RIS.

Clause 70. A first user equipment (UE), comprising: means for receiving a report request from a second UE to measure at least one positioning reference signal (PRS) transmitted from the second UE during a first time interval and a second time interval; and means for sending a report to the second UE in response to the report request, the report including a time-of-arrival associated with a direct path measurement of the at least one PRS obtained during the first time interval, the report further including both a time-of-arrival associated with a direct path measurement and a time-of-arrival associated with a reflective path measurement of the at least one PRS obtained during the second time interval.

Clause 71. The first UE of clause 70, wherein: the time-of-arrival associated with the direct path measurement of the at least one PRS is determined from an earliest received PRS measurement obtained by the first UE during the first time interval.

Clause 72. The first UE of any of clauses 70 to 71, wherein: the time-of-arrival associated with the direct path measurement of the at least one PRS is determined from an earliest received PRS measurement obtained by the first UE during the second time interval; and the time-of-arrival associated with the reflective path measurement of the at least one PRS is determined from a second, earliest received PRS measurement obtained by the first UE during the second time interval.

Clause 73. The first UE of any of clauses 70 to 72, wherein: each time-of-arrival is reported as a time difference with respect to a transmission time of the at least one PRS.

Clause 74. A first user equipment (UE), comprising: means for receiving, from a second UE, a reconfigurable intelligent surface (RIS) schedule, wherein the RIS schedule indicates times when at least one RIS of one or more RIS resources is in an enabled state and times when the at least one RIS of the one or more RIS is in a disabled state; means for receiving, from the second UE, a positioning reference signal (PRS) measurement schedule, wherein the PRS measurement schedule indicates times when at least one PRS from the second UE may be measured by the first UE; means for performing a first set of one or more measurements of the at least one PRS transmitted from the second UE in accordance with the PRS measurement schedule and the RIS schedule to obtain one or more measurements of the at least one PRS when the at least one RIS is in the disabled state; and means for performing a second set of one or more measurements of the at least one PRS transmitted from the second UE in accordance with the PRS measurement schedule and the RIS schedule to obtain one or more measurements of the at least one PRS when the at least one RIS is in the enabled state.

Clause 75. The first UE of clause 74, wherein: the second UE is a roadside unit (RSU).

Clause 76. The first UE of any of clauses 74 to 75, further comprising: means for coordinating the PRS measurement schedule and RIS schedule such that at least one measurement obtained when performing the first set of one or more measurements is obtained when the at least one PRS is received from the second UE over a coherent channel.

Clause 77. The first UE of any of clauses 74 to 76, wherein the means for performing the first set of one or more measurements, comprises: means for determining a time-of-arrival of the at least one PRS corresponding to a direct path measurement of the at least one PRS.

Clause 78. The first UE of clause 77, wherein the means for performing the second set of one or more measurements, comprises: means for determining a time-of-arrival of the at least one PRS corresponding to a direct path measurement of the at least one PRS; and means for determining a time-of-arrival of the at least one PRS corresponding to a reflective path measurement of the at least one PRS as reflected by the at least one RIS.

Clause 79. The first UE of clause 78, further comprising: means for transmitting at least one PRS when the at least one RIS is in the enabled state; means for transmitting at least one PRS when the at least one RIS is in the disabled state; means for receiving a report from the second UE, wherein the report indicates a first time-of-arrival measurement of the at least one PRS transmitted by the first UE made by the second UE when the at least one RIS is in the disabled state, wherein the first time-of-arrival measurement corresponds to a direct path measurement of the at least one PRS; a second time-of-arrival measurement of the at least one PRS transmitted by the first UE made by the second UE when the at least one RIS is in the enabled state, wherein the second time-of-arrival measurement corresponds to a direct path measurement of the at least one PRS; and a third time-of-arrival measurement of the at least one PRS transmitted by the first UE made by the second UE when the at least one RIS is in the enabled state, wherein the third time-of-arrival measurement corresponds to a reflective path measurement of the at least one PRS of the first UE from the at least one RIS.

Clause 80. The first UE of clause 79, further comprising: means for sending, to the second UE, a first time-of-transmission of the at least one PRS transmitted by the first UE when the at least one RIS is in the enabled state; and means for sending, to the second UE, a second time-of-transmission of the at least one PRS transmitted by the first UE when the at least one RIS is in the disabled state.

Clause 81. The first UE of clause 80, wherein: the report indicates the first time-of-arrival as a difference measurement with respect to the first time-of-transmission; the report indicates the second time-of-arrival as a difference measurement with respect to the second time-of-transmission; and the report indicates the third time-of-arrival as a difference measurement with respect to the second time-of-transmission.

Clause 82. The first UE of any of clauses 74 to 81, further comprising: means for determining a range between the first UE and the second UE using the one or more measurements obtained when performing the first set of one or more measurements.

Clause 83. The first UE of clause 82, wherein: means for determining the range between the first UE and the second UE includes using an averaging technique of multiple measurements obtained when performing the first set of one or more measurements.

Clause 84. The first UE of any of clauses 74 to 83, further comprising: means for determining a range between the first UE and the at least one RIS of the one or more RIS using the one or more measurements obtained when performing the second set of one or more measurements.

Clause 85. The first UE of any of clauses 74 to 84, further comprising: means for receiving, from the second UE, a known position of the second UE; and means for receiving, from the second UE, a position of the at least one RIS of the one or more RIS.

Clause 86. The first UE of clause 85, further comprising: means for determining a range between the first UE and the second UE using the one or more measurements obtained when performing the first set of one or more measurements; means for determining a range between the first UE and the at least one RIS using the one or more measurements obtained when performing the second set of one or more measurements; and means for determining a position of the first UE using the range between the first UE and the second UE, the range between the first UE and the at least one RIS, the known position of the second UE, and the known position of the at least one RIS.

Clause 87. A first user equipment (UE), comprising: means for receiving, from a second UE, an RIS schedule, wherein the RIS schedule indicates times when at least one RIS is in an enabled state and times when the at least one RIS is in a disabled state; means for sending a request to a third UE to transmit at least one positioning reference signal (PRS), wherein the request indicates times when the at least one PRS is expected to be transmitted by the third UE; and means for performing a first set of one or more measurements of the at least one PRS transmitted from the third UE in accordance with the RIS schedule to make one or more measurements of the at least one PRS when the at least one RIS is in the disabled state; and means for performing a second set of one or more measurements of the at least one PRS from the third UE in accordance with the RIS schedule to make one or more measurements of the at least one PRS when the at least one RIS is in the enabled state.

Clause 88. The first UE of clause 87, further comprising: means for sending, to the second UE, a request to control at least one reconfigurable intelligent surface (RIS) of one or more RIS.

Clause 89. The first UE of any of clauses 87 to 88, further comprising: means for coordinating the indicated times when the at least one PRS is expected to be transmitted by the third UE and the RIS schedule such that at least one measurement of obtained when performing the first set of one or more measurements is obtained when the at least one PRS is received from the third UE over a coherent channel.

Clause 90. The first UE of any of clauses 87 to 89, wherein the means for performing the first set of one or more measurements, comprises: means for measuring a time-of-arrival (ToA) of the at least one PRS from the third UE.

Clause 91. A non-transitory computer-readable medium storing computer-executable instructions that, when executed by a user equipment (UE), cause the UE to: control one or more reconfigurable intelligent surfaces (RIS) in accordance with one or more RIS schedules, wherein the one or more RIS schedules indicate times when the one or more RIS are in an enabled state and times when the one or more RIS are in a disabled state; request at least one participating UE of one or more participating UEs to transmit at least one positioning reference signal (PRS); perform a first set of one or more measurements of the at least one PRS transmitted from the at least one participating UE, wherein the at least one PRS is measured while performing the first set of one or more measurements in accordance with the RIS schedule to obtain one or more measurements of the at least one PRS when the one or more RIS are in the disabled state; and perform a second set of one or more measurements of the at least one PRS transmitted from the at least one participating UE, wherein the at least one PRS is measured while performing the second set of one or more measurements in accordance with the RIS schedule to obtain one or more measurements of the at least one PRS when the one or more RIS are in the enabled state.

Clause 92. The non-transitory computer-readable medium of clause 91, wherein: the UE is a roadside unit (RSU).

Clause 93. The non-transitory computer-readable medium of any of clauses 91 to 92, wherein: based on the RIS schedule, at least one measurement from performing the second set of one or more measurements is obtained when the at least one PRS is received from the at least one participating UE over a coherent channel.

Clause 94. The non-transitory computer-readable medium of any of clauses 91 to 93, wherein the computer-executable instructions that, when executed by the UE, cause the UE to perform the first set of one or more measurements comprise computer-executable instructions that, when executed by the UE, cause the UE to: measure a time-of-arrival (ToA) of the at least one PRS of the at least one participating UE.

Clause 95. The non-transitory computer-readable medium of any of clauses 91 to 94, further comprising computer-executable instructions that, when executed by the UE, cause the UE to: transmit a PRS transmission schedule to the at least one participating UE, wherein the PRS transmission schedule requests the at least one participating UE to transmit the at least one PRS at scheduled times indicated by the PRS transmission schedule, and wherein the PRS transmission schedule is determined based on the RIS schedule.

Clause 96. The non-transitory computer-readable medium of any of clauses 91 to 95, further comprising computer-executable instructions that, when executed by the UE, cause the UE to: determine a range between the UE and the at least one participating UE using the one or more measurements obtained when performing the first set of one or more measurements.

Clause 97. The non-transitory computer-readable medium of clause 96, wherein: determine the range between the UE and the at least one participating UE includes using an averaging technique of multiple measurements of the at least one PRS obtained when performing the first set of one or more measurements.

Clause 98. The non-transitory computer-readable medium of any of clauses 96 to 97, further comprising computer-executable instructions that, when executed by the UE, cause the UE to: determine a range between the at least one participating UE and at least one RIS of the one or more RIS using the one or more measurements of the at least one PRS obtained when performing the second set of one or more measurements.

Clause 99. The non-transitory computer-readable medium of any of clauses 91 to 98, further comprising computer-executable instructions that, when executed by the UE, cause the UE to: determine a range between the UE and the at least one participating UE using the one or more measurements of the at least one PRS obtained when performing the first set of one or more measurements; determine a range between the at least one participating UE and at least one RIS of the one or more RIS using the one or more measurements of the at least one PRS obtained when performing the second set of one or more measurements; and determine a position of the at least one participating UE using the range between the UE and the at least one participating UE, the range between the at least one participating UE and the at least one RIS, a known position of the UE, and a known position of the at least one RIS.

Clause 100. A non-transitory computer-readable medium storing computer-executable instructions that, when executed by a first user equipment (UE), cause the first UE to: receive a report request from a second UE to measure at least one positioning reference signal (PRS) transmitted from the second UE during a first time interval and a second time interval; and send a report to the second UE in response to the report request, the report including a time-of-arrival associated with a direct path measurement of the at least one PRS obtained during the first time interval, the report further including both a time-of-arrival associated with a direct path measurement and a time-of-arrival associated with a reflective path measurement of the at least one PRS obtained during the second time interval.

Clause 101. The non-transitory computer-readable medium of clause 100, wherein: the time-of-arrival associated with the direct path measurement of the at least one PRS is determined from an earliest received PRS measurement obtained by the first UE during the first time interval.

Clause 102. The non-transitory computer-readable medium of any of clauses 100 to 101, wherein: the time-of-arrival associated with the direct path measurement of the at least one PRS is determined from an earliest received PRS measurement obtained by the first UE during the second time interval; and the time-of-arrival associated with the reflective path measurement of the at least one PRS is determined from a second, earliest received PRS measurement obtained by the first UE during the second time interval.

Clause 103. The non-transitory computer-readable medium of any of clauses 100 to 102, wherein: each time-of-arrival is reported as a time difference with respect to a transmission time of the at least one PRS.

Clause 104. A non-transitory computer-readable medium storing computer-executable instructions that, when executed by a first user equipment (UE), cause the first UE to: receive, from a second UE, a reconfigurable intelligent surface (RIS) schedule, wherein the RIS schedule indicates times when at least one RIS of one or more RIS resources is in an enabled state and times when the at least one RIS of the one or more RIS is in a disabled state; receive, from the second UE, a positioning reference signal (PRS) measurement schedule, wherein the PRS measurement schedule indicates times when at least one PRS from the second UE may be measured by the first UE; perform a first set of one or more measurements of the at least one PRS transmitted from the second UE in accordance with the PRS measurement schedule and the RIS schedule to obtain one or more measurements of the at least one PRS when the at least one RIS is in the disabled state; and perform a second set of one or more measurements of the at least one PRS transmitted from the second UE in accordance with the PRS measurement schedule and the RIS schedule to obtain one or more measurements of the at least one PRS when the at least one RIS is in the enabled state.

Clause 105. The non-transitory computer-readable medium of clause 104, wherein: the second UE is a roadside unit (RSU).

Clause 106. The non-transitory computer-readable medium of any of clauses 104 to 105, further comprising computer-executable instructions that, when executed by the first UE, cause the first UE to: coordinate the PRS measurement schedule and RIS schedule such that at least one measurement obtained when performing the first set of one or more measurements is obtained when the at least one PRS is received from the second UE over a coherent channel.

Clause 107. The non-transitory computer-readable medium of any of clauses 104 to 106, wherein the computer-executable instructions that, when executed by the first UE, cause the first UE to perform the first set of one or more measurements, comprise computer-executable instructions that, when executed by the UE, cause the UE to: determine a time-of-arrival of the at least one PRS corresponding to a direct path measurement of the at least one PRS.

Clause 108. The non-transitory computer-readable medium of clause 107, wherein the computer-executable instructions that, when executed by the first UE, cause the first UE to perform the second set of one or more measurements, comprise computer-executable instructions that, when executed by the UE, cause the UE to: determine a time-of-arrival of the at least one PRS corresponding to a direct path measurement of the at least one PRS; and determine a time-of-arrival of the at least one PRS corresponding to a reflective path measurement of the at least one PRS as reflected by the at least one RIS.

Clause 109. The non-transitory computer-readable medium of clause 108, further comprising computer-executable instructions that, when executed by the first UE, cause the first UE to: transmit at least one PRS when the at least one RIS is in the enabled state; transmit at least one PRS when the at least one RIS is in the disabled state; receive a report from the second UE, wherein the report indicates a first time-of-arrival measurement of the at least one PRS transmitted by the first UE made by the second UE when the at least one RIS is in the disabled state, wherein the first time-of-arrival measurement corresponds to a direct path measurement of the at least one PRS; a second time-of-arrival measurement of the at least one PRS transmitted by the first UE made by the second UE when the at least one RIS is in the enabled state, wherein the second time-of-arrival measurement corresponds to a direct path measurement of the at least one PRS; and a third time-of-arrival measurement of the at least one PRS transmitted by the first UE made by the second UE when the at least one RIS is in the enabled state, wherein the third time-of-arrival measurement corresponds to a reflective path measurement of the at least one PRS of the first UE from the at least one RIS.

Clause 110. The non-transitory computer-readable medium of clause 109, further comprising computer-executable instructions that, when executed by the first UE, cause the first UE to: send, to the second UE, a first time-of-transmission of the at least one PRS transmitted by the first UE when the at least one RIS is in the enabled state; and send, to the second UE, a second time-of-transmission of the at least one PRS transmitted by the first UE when the at least one RIS is in the disabled state.

Clause 111. The non-transitory computer-readable medium of clause 110, wherein: the report indicates the first time-of-arrival as a difference measurement with respect to the first time-of-transmission; the report indicates the second time-of-arrival as a difference measurement with respect to the second time-of-transmission; and the report indicates the third time-of-arrival as a difference measurement with respect to the second time-of-transmission.

Clause 112. The non-transitory computer-readable medium of any of clauses 104 to 111, further comprising computer-executable instructions that, when executed by the first UE, cause the first UE to: determine a range between the first UE and the second UE using the one or more measurements obtained when performing the first set of one or more measurements.

Clause 113. The non-transitory computer-readable medium of clause 112, wherein:
 determine the range between the first UE and the second UE includes using an averaging technique of multiple measurements obtained when performing the first set of one or more measurements.

Clause 114. The non-transitory computer-readable medium of any of clauses 104 to 113, further comprising computer-executable instructions that, when executed by the first UE, cause the first UE to: determine a range between the first UE and the at least one RIS of the one or more RIS using the one or more measurements obtained when performing the second set of one or more measurements.

Clause 115. The non-transitory computer-readable medium of any of clauses 104 to 114, further comprising computer-executable instructions that, when executed by the first UE, cause the first UE to: receive, from the second UE, a known position of the second UE; and receive, from the second UE, a position of the at least one RIS of the one or more MS.

Clause 116. The non-transitory computer-readable medium of clause 115, further comprising computer-executable instructions that, when executed by the UE, cause the UE to: determine a range between the first UE and the second UE using the one or more measurements obtained when performing the first set of one or more measurements; determine a range between the first UE and the at least one MS using the one or more measurements obtained when performing the second set of one or more measurements; and determine a position of the first UE using the range between the first UE and the second UE, the range between the first UE and the at least one MS, the known position of the second UE, and the known position of the at least one MS.

Clause 117. A non-transitory computer-readable medium storing computer-executable instructions that, when executed by a first user equipment (UE), cause the first UE to: receive, from a second UE, an RIS schedule, wherein the RIS schedule indicates times when at least one RIS is in an enabled state and times when the at least one RIS is in a disabled state; send a request to a third UE to transmit at least one positioning reference signal (PRS), wherein the request indicates times when the at least one PRS is expected to be transmitted by the third UE; and perform a first set of one or more measurements of the at least one PRS transmitted from the third UE in accordance with the RIS schedule to make one or more measurements of the at least one PRS when the at least one RIS is in the disabled state; and perform a second set of one or more measurements of the at least one PRS from the third UE in accordance with the RIS schedule to make one or more measurements of the at least one PRS when the at least one RIS is in the enabled state.

Clause 118. The non-transitory computer-readable medium of clause 117, further comprising computer-executable instructions that, when executed by the first UE, cause the first UE to: send, to the second UE, a request to control at least one reconfigurable intelligent surface (RIS) of one or more RIS.

Clause 119. The non-transitory computer-readable medium of any of clauses 117 to 118, further comprising computer-executable instructions that, when executed by the first UE, cause the first UE to: coordinate the indicated times when the at least one PRS is expected to be transmitted by the third UE and the RIS schedule such that at least one measurement of obtained when performing the first set of one or more measurements is obtained when the at least one PRS is received from the third UE over a coherent channel.

Clause 120. The non-transitory computer-readable medium of any of clauses 117 to 119, wherein the computer-executable instructions that, when executed by the first UE, cause the first UE to perform the first set of one or more measurements, comprise computer-executable instructions that, when executed by the UE, cause the UE to: measure a time-of-arrival (ToA) of the at least one PRS from the third UE.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general-purpose processor, a DSP, an ASIC, a FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
controlling one or more reconfigurable intelligent surfaces (RIS) in accordance with one or more RIS schedules, wherein the one or more RIS schedules indicate times when the one or more RIS are in an enabled state and times when the one or more RIS are in a disabled state;
requesting at least one participating UE of one or more participating UEs to transmit at least one positioning reference signal (PRS);
performing a first set of one or more measurements of the at least one PRS transmitted from the at least one participating UE, wherein the at least one PRS is measured while performing the first set of one or more measurements in accordance with the RIS schedule to obtain one or more measurements of the at least one PRS when the one or more RIS are in the disabled state; and
performing a second set of one or more measurements of the at least one PRS transmitted from the at least one participating UE, wherein the at least one PRS is measured while performing the second set of one or more measurements in accordance with the RIS schedule to obtain one or more measurements of the at least one PRS when the one or more RIS are in the enabled state.

2. The method of claim 1, wherein:
the UE is a roadside unit (RSU).

3. The method of claim 1, wherein:
based on the RIS schedule, at least one measurement from performing the second set of one or more measurements is obtained when the at least one PRS is received from the at least one participating UE over a coherent channel.

4. The method of claim 1, wherein performing the first set of one or more measurements comprises:
measuring a time-of-arrival (ToA) of the at least one PRS of the at least one participating UE.

5. The method of claim 1, further comprising:
transmitting a PRS transmission schedule to the at least one participating UE, wherein the PRS transmission schedule requests the at least one participating UE to transmit the at least one PRS at scheduled times indicated by the PRS transmission schedule, and wherein the PRS transmission schedule is determined based on the RIS schedule.

6. The method of claim 1, further comprising:
determining a range between the UE and the at least one participating UE using the one or more measurements obtained when performing the first set of one or more measurements.

7. The method of claim 6, wherein:
determining the range between the UE and the at least one participating UE includes using an averaging technique of multiple measurements of the at least one PRS obtained when performing the first set of one or more measurements.

8. The method of claim 6, further comprising:
determining a range between the at least one participating UE and at least one RIS of the one or more RIS using the one or more measurements of the at least one PRS obtained when performing the second set of one or more measurements.

9. The method of claim 1, further comprising:
determining a range between the UE and the at least one participating UE using the one or more measurements of the at least one PRS obtained when performing the first set of one or more measurements;
determining a range between the at least one participating UE and at least one RIS of the one or more RIS using the one or more measurements of the at least one PRS obtained when performing the second set of one or more measurements; and
determining a position of the at least one participating UE using the range between the UE and the at least one participating UE, the range between the at least one participating UE and the at least one RIS, a known position of the UE, and a known position of the at least one RIS.

10. A method of wireless communication performed by a first user equipment (UE), comprising:
receiving, from a second UE, a reconfigurable intelligent surface (RIS) schedule, wherein the RIS schedule indicates times when at least one RIS of one or more RIS resources is in an enabled state and times when the at least one RIS of the one or more RIS is in a disabled state;
receiving, from the second UE, a positioning reference signal (PRS) measurement schedule, wherein the PRS measurement schedule indicates times when at least one PRS from the second UE may be measured by the first UE;
performing a first set of one or more measurements of the at least one PRS transmitted from the second UE in accordance with the PRS measurement schedule and the RIS schedule to obtain one or more measurements of the at least one PRS when the at least one RIS is in the disabled state; and
performing a second set of one or more measurements of the at least one PRS transmitted from the second UE in accordance with the PRS measurement schedule and the RIS schedule to obtain one or more measurements of the at least one PRS when the at least one RIS is in the enabled state.

11. The method of claim 10, wherein:
the second UE is a roadside unit (RSU).

12. The method of claim 10, further comprising:
coordinating the PRS measurement schedule and RIS schedule such that at least one measurement obtained when performing the first set of one or more measurements is obtained when the at least one PRS is received from the second UE over a coherent channel.

13. The method of claim 10, wherein performing the first set of one or more measurements, comprises:
determining a time-of-arrival of the at least one PRS corresponding to a direct path measurement of the at least one PRS.

14. The method of claim 13, wherein performing the second set of one or more measurements, comprises:
determining a time-of-arrival of the at least one PRS corresponding to a direct path measurement of the at least one PRS; and
determining a time-of-arrival of the at least one PRS corresponding to a reflective path measurement of the at least one PRS as reflected by the at least one RIS.

15. The method of claim 14, further comprising:
transmitting, by the first UE, at least one PRS when the at least one RIS is in the enabled state;
transmitting, by the first UE, at least one PRS when the at least one RIS is in the disabled state;

receiving a report from the second UE, wherein the report indicates
- a first time-of-arrival measurement of the at least one PRS transmitted by the first UE made by the second UE when the at least one RIS is in the disabled state, wherein the first time-of-arrival measurement corresponds to a direct path measurement of the at least one PRS;
- a second time-of-arrival measurement of the at least one PRS transmitted by the first UE made by the second UE when the at least one RIS is in the enabled state, wherein the second time-of-arrival measurement corresponds to a direct path measurement of the at least one PRS; and
- a third time-of-arrival measurement of the at least one PRS transmitted by the first UE made by the second UE when the at least one RIS is in the enabled state, wherein the third time-of-arrival measurement corresponds to a reflective path measurement of the at least one PRS of the first UE from the at least one RIS.

16. The method of claim 15, further comprising:
sending, to the second UE, a first time-of-transmission of the at least one PRS transmitted by the first UE when the at least one RIS is in the enabled state; and
sending, to the second UE, a second time-of-transmission of the at least one PRS transmitted by the first UE when the at least one RIS is in the disabled state.

17. The method of claim 16, wherein:
the report indicates the first time-of-arrival as a difference measurement with respect to the first time-of-transmission;
the report indicates the second time-of-arrival as a difference measurement with respect to the second time-of-transmission; and
the report indicates the third time-of-arrival as a difference measurement with respect to the second time-of-transmission.

18. The method of claim 10, further comprising:
determining a range between the first UE and the second UE using the one or more measurements obtained when performing the first set of one or more measurements.

19. The method of claim 18, wherein:
determining the range between the first UE and the second UE includes using an averaging technique of multiple measurements obtained when performing the first set of one or more measurements.

20. The method of claim 10, further comprising:
determining a range between the first UE and the at least one RIS of the one or more RIS using the one or more measurements obtained when performing the second set of one or more measurements.

21. The method of claim 10, further comprising:
receiving, from the second UE, a known position of the second UE; and
receiving, from the second UE, a position of the at least one RIS of the one or more RIS.

22. The method of claim 21, further comprising:
determining a range between the first UE and the second UE using the one or more measurements obtained when performing the first set of one or more measurements;
determining a range between the first UE and the at least one RIS using the one or more measurements obtained when performing the second set of one or more measurements; and
determining a position of the first UE using the range between the first UE and the second UE, the range between the first UE and the at least one RIS, the known position of the second UE, and the known position of the at least one RIS.

23. A user equipment (UE), comprising:
a memory;
at least one transceiver; and
at least one processor communicatively coupled to the memory and the at least one transceiver, the at least one processor configured to:
- control one or more reconfigurable intelligent surfaces (RIS) in accordance with one or more RIS schedules, wherein the one or more RIS schedules indicate times when the one or more RIS are in an enabled state and times when the one or more RIS are in a disabled state;
- request at least one participating UE of one or more participating UEs to transmit at least one positioning reference signal (PRS);
- perform a first set of one or more measurements of the at least one PRS transmitted from the at least one participating UE, wherein the at least one PRS is measured while performing the first set of one or more measurements in accordance with the RIS schedule to obtain one or more measurements of the at least one PRS when the one or more RIS are in the disabled state; and
- perform a second set of one or more measurements of the at least one PRS transmitted from the at least one participating UE, wherein the at least one PRS is measured while performing the second set of one or more measurements in accordance with the RIS schedule to obtain one or more measurements of the at least one PRS when the one or more RIS are in the enabled state.

24. The UE of claim 23, wherein:
the UE is a roadside unit (RSU).

25. The UE of claim 23, wherein:
based on the RIS schedule, at least one measurement from performing the second set of one or more measurements is obtained when the at least one PRS is received from the at least one participating UE over a coherent channel.

26. The UE of claim 23, wherein, to perform the first set of one or more measurements, the at least one processor is configured to:
measure a time-of-arrival (ToA) of the at least one PRS of the at least one participating UE.

27. The UE of claim 23, wherein the at least one processor is further configured to:
transmit, via the at least one transceiver, a PRS transmission schedule to the at least one participating UE, wherein the PRS transmission schedule requests the at least one participating UE to transmit the at least one PRS at scheduled times indicated by the PRS transmission schedule, and wherein the PRS transmission schedule is determined based on the RIS schedule.

28. The UE of claim 23, wherein the at least one processor is further configured to:
determine a range between the UE and the at least one participating UE using the one or more measurements obtained when performing the first set of one or more measurements.

29. The UE of claim 28, wherein:
determine the range between the UE and the at least one participating UE includes using an averaging technique of multiple measurements of the at least one PRS obtained when performing the first set of one or more measurements.

30. The UE of claim 28, wherein the at least one processor is further configured to:
determine a range between the at least one participating UE and at least one RIS of the one or more RIS using the one or more measurements of the at least one PRS obtained when performing the second set of one or more measurements.

31. The UE of claim 23, wherein the at least one processor is further configured to:
determine a range between the UE and the at least one participating UE using the one or more measurements of the at least one PRS obtained when performing the first set of one or more measurements;
determine a range between the at least one participating UE and at least one RIS of the one or more RIS using the one or more measurements of the at least one PRS obtained when performing the second set of one or more measurements; and
determine a position of the at least one participating UE using the range between the UE and the at least one participating UE, the range between the at least one participating UE and the at least one RIS, a known position of the UE, and a known position of the at least one RIS.

32. A first user equipment (UE), comprising:
a memory;
at least one transceiver; and
at least one processor communicatively coupled to the memory and the at least one transceiver, the at least one processor configured to:
receive, via the at least one transceiver, from a second UE, a reconfigurable intelligent surface (RIS) schedule, wherein the RIS schedule indicates times when at least one RIS of one or more RIS resources is in an enabled state and times when the at least one RIS of the one or more RIS is in a disabled state;
receive, via the at least one transceiver, from the second UE, a positioning reference signal (PRS) measurement schedule, wherein the PRS measurement schedule indicates times when at least one PRS from the second UE may be measured by the first UE;
perform a first set of one or more measurements of the at least one PRS transmitted from the second UE in accordance with the PRS measurement schedule and the RIS schedule to obtain one or more measurements of the at least one PRS when the at least one RIS is in the disabled state; and
perform a second set of one or more measurements of the at least one PRS transmitted from the second UE in accordance with the PRS measurement schedule and the RIS schedule to obtain one or more measurements of the at least one PRS when the at least one RIS is in the enabled state.

33. The first UE of claim 32, wherein:
the second UE is a roadside unit (RSU).

34. The first UE of claim 32, wherein the at least one processor is further configured to:
coordinate the PRS measurement schedule and RIS schedule such that at least one measurement obtained when performing the first set of one or more measurements is obtained when the at least one PRS is received from the second UE over a coherent channel.

35. The first UE of claim 32, wherein, to perform the first set of one or more measurements, the at least one processor is configured to:
determine a time-of-arrival of the at least one PRS corresponding to a direct path measurement of the at least one PRS.

36. The first UE of claim 35, wherein, to perform the second set of one or more measurements, the at least one processor is configured to:
determine a time-of-arrival of the at least one PRS corresponding to a direct path measurement of the at least one PRS; and
determine a time-of-arrival of the at least one PRS corresponding to a reflective path measurement of the at least one PRS as reflected by the at least one RIS.

37. The first UE of claim 36, wherein the at least one processor is further configured to:
transmit, via the at least one transceiver, at least one PRS when the at least one RIS is in the enabled state;
transmit, via the at least one transceiver, at least one PRS when the at least one RIS is in the disabled state;
receive, via the at least one transceiver, a report from the second UE, wherein the report indicates
a first time-of-arrival measurement of the at least one PRS transmitted by the first UE made by the second UE when the at least one RIS is in the disabled state, wherein the first time-of-arrival measurement corresponds to a direct path measurement of the at least one PRS;
a second time-of-arrival measurement of the at least one PRS transmitted by the first UE made by the second UE when the at least one RIS is in the enabled state, wherein the second time-of-arrival measurement corresponds to a direct path measurement of the at least one PRS; and
a third time-of-arrival measurement of the at least one PRS transmitted by the first UE made by the second UE when the at least one RIS is in the enabled state, wherein the third time-of-arrival measurement corresponds to a reflective path measurement of the at least one PRS of the first UE from the at least one RIS.

38. The first UE of claim 37, wherein the at least one processor is further configured to:
send, via the at least one transceiver, to the second UE, a first time-of-transmission of the at least one PRS transmitted by the first UE when the at least one RIS is in the enabled state; and
send, via the at least one transceiver, to the second UE, a second time-of-transmission of the at least one PRS transmitted by the first UE when the at least one RIS is in the disabled state.

39. The first UE of claim 32, wherein the at least one processor is further configured to:
determine a range between the first UE and the second UE using the one or more measurements obtained when performing the first set of one or more measurements; and
determine a range between the first UE and the at least one RIS of the one or more RIS using the one or more measurements obtained when performing the second set of one or more measurements.

40. The first UE of claim 32, wherein the at least one processor is further configured to:
receive, via the at least one transceiver, from the second UE, a known position of the second UE;

receive, via the at least one transceiver, from the second UE, a position of the at least one RIS of the one or more RIS;

determine a range between the first UE and the second UE using the one or more measurements obtained when performing the first set of one or more measurements;

determine a range between the first UE and the at least one RIS using the one or more measurements obtained when performing the second set of one or more measurements; and determine a position of the first UE using the range between the first UE and the second UE, the range between the first UE and the at least one RIS, the known position of the second UE, and the known position of the at least one RIS.

* * * * *